United States Patent [19]
Mihara

[11] Patent Number: 5,933,532
[45] Date of Patent: Aug. 3, 1999

[54] VIDEO DATA COMPRESSION APPARATUS AND METHOD OF SAME

[75] Inventor: Kanji Mihara, Kanagawa, Japan

[73] Assignee: Sony Corporation, Tokyo, Japan

[21] Appl. No.: 08/918,813

[22] Filed: Aug. 26, 1997

[30] Foreign Application Priority Data

Aug. 30, 1996 [JP] Japan .................................. 8-229650

[51] Int. Cl.$^6$ ....................................... G06K 9/36
[52] U.S. Cl. ........................................ 382/232; 382/236
[58] Field of Search ................................ 382/232, 239,
382/236; 348/405, 419, 469, 700; 358/426,
261.1, 261.2, 261.3; 364/715.02; 375/240,
246, 253

[56] References Cited

U.S. PATENT DOCUMENTS 5,231,484  7/1993  Gonzales et al. ....................... 348/405

*Primary Examiner*—Jose L. Couso
*Assistant Examiner*—Anh Hong Do
*Attorney, Agent, or Firm*—Frommer Lawrence & Haug, LLP.; William S. Frommer

[57] ABSTRACT

A video data compression apparatus comprising, a difficulty data calculating means for calculating difficulty data indicating the difficulty of the noncompressed video data corresponding to the amount of data of each of the picture types after compression, a target value calculating means for calculating a target value of the amount of data of the picture of each of the picture types after the compression based on said difficulty data, a compressing means for compressing the picture of each of picture types of the noncompressed video data by said predetermined compression method, and a weighting coefficient updating means for updating the weighting coefficient of each of the picture types based on the amount of data of the generated compressed video data.

12 Claims, 16 Drawing Sheets

VIDEO DATA COMPRESSION APPARATUS AND METHOD OF SAME

BACKGROUND OF THE INVENTION

1. Field of the Invention

The present invention relates to a video data compression apparatus for compressing and coding noncompressed video data and a method of the same.

2. Description of the Related Art

When compressing and coding noncompressed digital video data in units of GOPs (groups of pictures) comprised of an I picture (intra-coded picture), a B picture (bi-directionally predictive coded picture), and a P picture (predictive coded picture) by a method such as the MPEG (Moving Picture Experts Group) and recording the same on a recording medium such as a magneto-optical disc (MO disc) or transmitting the same via transmitting line, it is necessary to control the amount of data (amount of bits) of the compressed video data after the compression and coding to be not more than the recording capacity of the recording medium or not more than the transmission capacity of the communication line while holding the quality of the image after expansion and decoding high.

For this purpose, first, there is adopted a method of preliminarily compressing and coding the noncompressed video data to estimate the amount of data after the compression and coding (first pass), then adjusting the compression rate based on the estimated amount of data and performing the compression and coding so that the amount of data after the compression and coding becomes not more than the recording capacity of the recording medium by (second pass) (hereinafter, such a compression and coding method will be also referred to as "two pass encoding").

However, if performing the compression and coding by the two pass encoding, it is necessary to apply similar compression and coding processing two times with respect to the same noncompressed video data, so a long time is taken. Further, since the final compressed video data cannot be calculated by one compression and coding processing, the shot video data cannot be compressed, coded, and recorded in real time as it is.

SUMMARY OF THE INVENTION

An object thereof to provide a video data compression apparatus with which the audio and/or video data can be compressed and coded to a predetermined amount of data or less not by the two pass encoding and a method of the same.

Another object of the present invention is to provide a video data compression apparatus with which the video data can be compressed and coded in almost real time and in addition with which a high quality image can be obtained after the expansion and decoding and a method of the same.

Still another object of the present invention is to provide a video data compression apparatus with which the compression and coding processing can be carried out by adjusting the compression rate by estimating the amount of data after the compression and coding not by the two pass encoding and a method of the same.

To attain the above object, a video data compression apparatus according to the present invention is a video data compression apparatus for compressing noncompressed video data to compressed video data of a picture type sequence containing a plurality of types of pictures (I frame, P frame, and B frame) in a predetermined order based on a predetermined compression method, comprising a difficulty data calculating means for calculating difficulty data indicating a difficulty of the noncompressed video data corresponding to the amount of data of each of the picture types after compression; a target value calculating means for calculating a target value of the amount of data of the picture of each of the picture types after the compression based on the difficulty data of each of the calculated picture types and a weighting coefficient for weighting the amount of data of each of the picture types after the compression; a compressing means for compressing the picture of each of picture types of the noncompressed video data by the predetermined compression method so that the amount of data after compression becomes the target value of the picture type which was calculated so as to generate the compressed video data; and a weighting coefficient updating means for updating the weighting coefficient of each of the picture types based on the amount of data of the generated compressed video data.

Preferably, the weighting coefficient updating means determines at least a weighting coefficient $K_P$ of a P picture and a weighting coefficient $K_B$ of a B picture to such values that the amount of data after compression of the P picture and the B picture after the compression becomes large when the amount of data after compression can be increased and when the motion of the image of the noncompressed video data is large.

Preferably, the weighting coefficient updating means calculates and updates at least each of the weighting coefficient $K_P$ of the P picture and the weighting coefficient $K_B$ of the B picture based on a ratio x ($x=\Sigma D_k/G$) of an added value $\Sigma D_k$ of a predetermined number of difficulty data $D_k$ with respect to data amount G equally allocated for every predetermined number of pictures, a ratio ($D_I/D_P$) of the difficulty data of the newest P picture with respect to the difficulty data of the newest I picture, and a ratio ($D_I/D_B$) of the difficulty data of the newest B picture with respect to the difficulty data of the I picture.

Preferably, the weighting coefficient updating means respectively provides upper limit values $L_P$ and $L_B$ for the weighting coefficients $K_P$ and $K_B$ of the P picture and the B picture and makes the values of the weighting coefficients $K_P$ and $K_B$ exceeding the upper limit values $L_P$ and $L_B$ the upper limit values $L_P$ and $L_B$ when the calculated weighting coefficients $K_P$ and $K_B$ exceed the upper limit values $L_P$ and $L_B$.

Preferably, the target value calculating means calculates the target values $T_j$ of the I picture, the P picture, and the B picture based on the added value $\Sigma D_P$ obtained by adding the weighting coefficient $K_P$ of the P picture, the weighting coefficient $K_B$ of the B picture, the difficulty data $D_j$ of the j-th picture, the difficulty data $D_I$ of the newest I picture, an amount of data $R_j$ in a case of equal allocation to the pictures, the difficulty data of a predetermined number of P pictures, and an added value $\Sigma D_B$ obtained by adding the difficulty data of a predetermined number of B pictures.

Preferably, the target value calculating means calculates the target value $T_j$ of the j-th picture of the I picture by a first equation $[T_j = K_P K_B D_j R_j / (K_P K_B D_I + K_B \Sigma D_P + K_P \Sigma D_B)]$; calculates the target value $T_{pj}$ of the j-th picture of the P picture by a second equation $[T_j = K_B D_B R_j / (K_P K_B D_I + K_B \Sigma D_P + K_P \Sigma D_B)]$; and calculates the target value $T_j$ of the j-th picture of the B picture by a third equation $[T_j = K_P D_B R_j / (K_P K_B D_I + K_B \Sigma D_P + K_P \Sigma D_B)]$.

The video data compression apparatus according to the present invention compresses and codes the noncompressed video data by a compression and coding system, for example the MPEG system, to generate the compressed video data of a picture type sequence containing a plurality of types of pictures (I frame, P frame, and B frame) in a predetermined order.

In the video data compression apparatus according to the present invention, the difficulty data calculating means approximately calculates the difficulty data which is found as the amount of data in a case where a picture after DCT processing is quantized by a fixed quantization value by substituting for example a predetermined numerical value in a predetermined function (primary function etc.) and which indicates the complexity of the pattern of the pictures of the noncompressed video data for each picture type (I picture, P picture, and B picture).

Note that, as the predetermined numerical value for the calculation of the difficulty data, use is made of for example an ME residual which is defined as an electric power of an error component between two pictures when generating the motion vector at the time of generation of the P picture and the B picture, a flatness and intra AC newly defined as the data indicating the complexity of the pattern of the picture which becomes the I picture after the compression and coding, or a global complexity used for finding the quantization value at the time of the quantization processing.

The target value calculating means calculates the target value $T_j$ of the amount of data of compression and coding for every picture type from the difficulty data $(D_j:D_I, D_P, D_B)$ of the calculated picture types. Specifically, for example, the target value calculating means substitutes numerical values of the added value $\Sigma D_P$ obtained by adding the weighting coefficient $K_P$ of the P picture, the weighting coefficient $K_B$ of the B picture, the difficulty data $D_j$ of the j-th picture, the difficulty data $D_I$ of the newest I picture, an amount of data $R_j$ in the case of equal allocation to the pictures, the difficulty data of predetermined number of P pictures, and an added value $\Sigma D_B$ obtained by adding the difficulty data of predetermined number of B pictures into the first equation $[T_j = K_P K_B D_j R_j/(K_P K_B D_I + K_B \Sigma D_P + K_P \Sigma D_B)]$, the second equation $[T_j = K_B D_B R_j/(K_P K_B D_I + K_B \Sigma D_P + K_P \Sigma D_B)]$, and the third equation $[T_j = K_P D_B R_j/(K_P K_B D_I + K_B \Sigma D_P + K_P \Sigma D_B)]$, respectively, to calculate the target values $T_j$ of the picture types.

The compressing means controls the quantization value so that the amount of data of each picture type after compression by for example the MPEG system becomes the target value $T_j$ calculated by the target value calculating means and compresses and codes each of the pictures of the noncompressed video data.

The weighting coefficient updating means updates the weighting coefficients $K_P$ and $K_B$ in the first equation to the third equation based on the amount of data of each picture type generated by the compressing means and optimizes the same to the value in accordance with the complexity of the pattern of the noncompressed video data so that the quality of the compressed video data is improved as a whole.

Specifically, the weighting coefficient updating means controls the weighting coefficients $K_P$ and $K_B$ to small values so as to increase the amount of data after compression of the P picture and the B picture after compression when for example the amount of data after compression can be made large and when the motion of the image of the noncompressed video data is large and, provides the upper limit values $L_P$ and $L_B$ for the weighting coefficients $K_P$ and $K_B$, respectively, thereby to prevent a lowering of quality of the image because of these coefficients becoming extreme values.

Further, a video data compression method according to the present invention is a video data compression method for compressing noncompressed video data to compressed video data of a picture type sequence containing a plurality of types of pictures (I frame, P frame, and B frame) in a predetermined order based on a predetermined compression method, comprising the steps of calculating difficulty data indicating a difficulty of the noncompressed video data corresponding to the amount of data of each of the picture types after compression; calculating a target value of the amount of data of the picture of each of the picture types after the compression based on the difficulty data of each of the calculated picture types and a weighting coefficient for weighting the amount of data of each of the picture types after the compression; compressing the picture of each of the picture types of the noncompressed video data by the predetermined compression method so that the amount of data after compression becomes the target value of the picture type which was calculated so as to generate the compressed video data; and updating the weighting coefficient of each of the picture types based on the amount of data of the generated compressed video data.

BRIEF DESCRIPTION OF THE DRAWINGS

These and other objects and features of the present invention will become more apparent from the following description of the preferred embodiments given with reference to the attached drawings, wherein.

DESCRIPTION OF THE PREFERRED EMBODIMENTS

First Embodiment

Below, a first embodiment of the present invention will be explained.

If video data having a high difficulty for coding such as a pattern having a large number of high frequency components or a pattern having a large amount of motion is compressed and coded by a compression and coding system of video data such as the MPEG system, generally distortion accompanying the compression is apt to occur. For this reason, it is necessary to compress and code video data having a high difficulty with a low compression rate and allocate a larger target amount of data with respect to the compressed video data obtained by compressing and coding the data having a high difficulty in comparison with compressed video data of video data of a pattern having a low difficulty.

In order to adaptively allocate the target amount of data with respect to the difficulty of the video data in this way, the two pass encoding system indicated as the related art is effective. However, the two pass encoding system is not suited to real time compression and coding.

The simplified two pass encoding system indicated as the first embodiment was devised so as to solve the problem of such a two pass encoding system. It can calculate the difficulty of the noncompressed video data from the difficulty data of the compressed video data obtained by preliminarily compressing and coding the noncompressed video data and adaptively control the compression rate of the noncompressed video data delayed by exactly a predetermined time by an FIFO memory or the like based on the difficulty calculated by the preliminary compression and coding.

Figure 1:
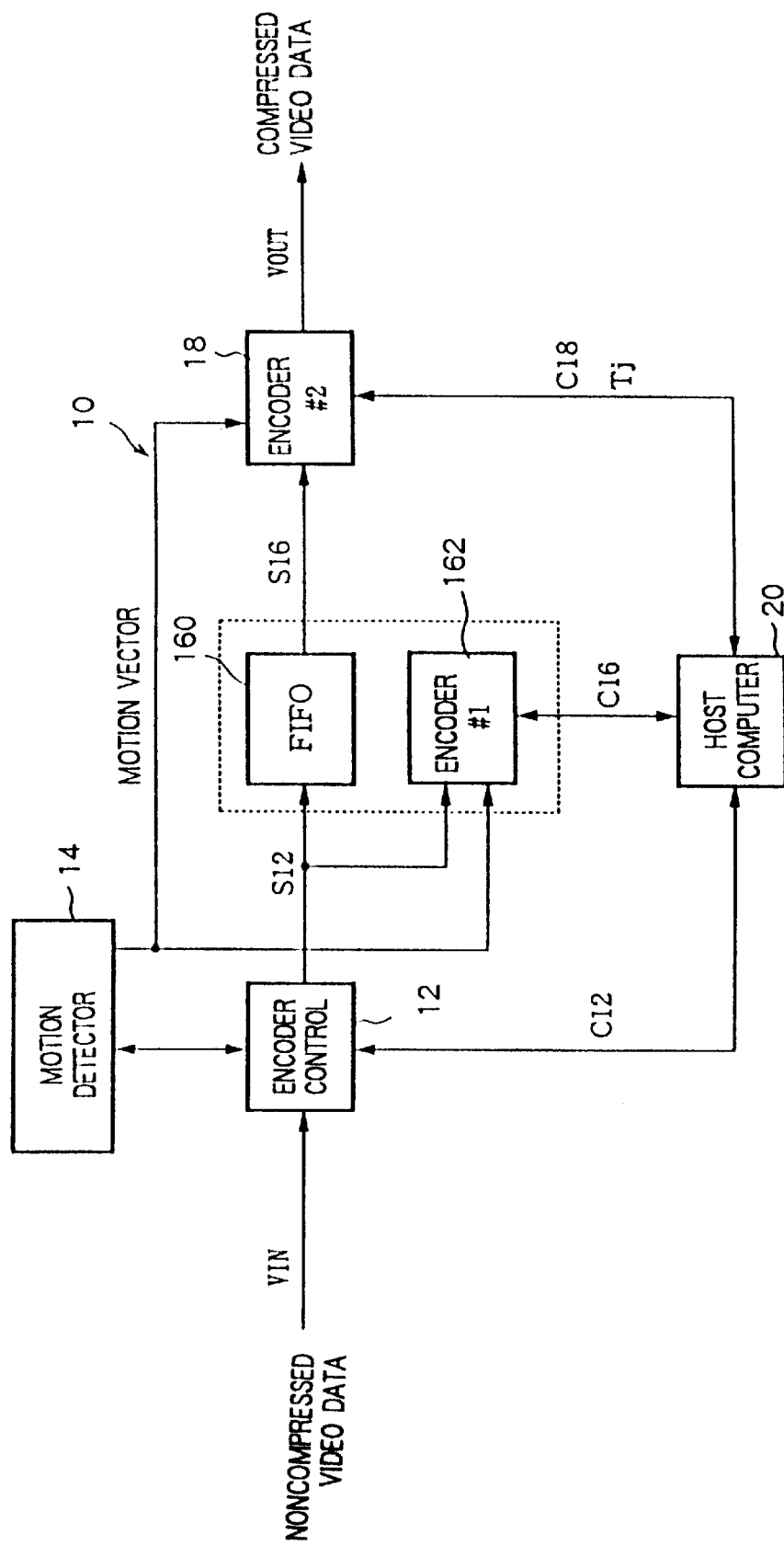
FIG. 1 is a view of the configuration of a video data compression apparatus according to the present invention.

FIG. 1 is a view of the configuration of a video data compression apparatus 1 according to the present invention.

As shown in FIG. 1, the video data compression apparatus 1 is constituted by a compression and coding unit 10 and a host computer 20. The compression and coding unit 10 is constituted by an encoder control unit 12, a motion estimator 14, a simplified two pass processing unit 16, and a second encoder 18. The simplified two pass processing unit 16 is constituted by an FIFO memory 160 and a first encoder 162.

The video data compression apparatus 1 realizes the above simplified two pass encoding with respect to the noncompressed video data VIN input from an external apparatus (not illustrated) such as an editing apparatus and a video tape recorder apparatus by these constituent parts.

In the video data compression apparatus 1, the host computer 20 controls the operation of the constituent parts of the video data compression apparatus 1. Further, the host computer 20 receives the amount of data of the compressed video data generated by preliminarily compressing and coding the noncompressed video data VIN by the encoder 162 of the simplified two pass processing unit 16, the value of the direct current component (DC component) of the video data after the DCT processing, and the power value of the alternating current component (AC component) via a control signal C16 and calculates the difficulty of the pattern of the compressed video data based on these received values. Further, the host computer 20 allocates the target amount of data $T_j$ of the compressed video data generated by the encoder 18 via the control signal C18 for every picture based on the calculated difficulty, sets the same in the quantization circuit 166 (FIG. 3) of the encoder 18, and adaptively controls the compression rate of the encoder 18 in units of pictures.

The encoder control unit 12 notifies the existence of a picture of the noncompressed video data VIN to the host computer 20 and further performs the preprocessing for the compression and coding for every picture of the noncompressed video data VIN. That is, the encoder control unit 12 rearranges the input noncompressed video data in the order of coding, performs picture field transformation, performs 3:2 pull down processing (processing for transforming the video data of 24 frames/sec of a movie to video data of 30 frames/sec), etc. when the noncompressed video data VIN is the video data of a movie and outputs the same as the video data S12 to the FIFO memory 160 and the encoder 162 of the simplified two pass processing unit 16.

The motion estimator 14 performs the detection of the motion vector of the noncompressed video data and outputs the same to the encoder control unit 12 and the encoders 162 and 18.

In the simplified two pass processing unit 16, the FIFO memory 160 delays the video data S12 input from the encoder control unit 12 by exactly a time by which for example L (L is an integer) number of pictures of the noncompressed video data VIN is input and outputs the same as the delayed video data S16 to the encoder 18.

Figure 2:
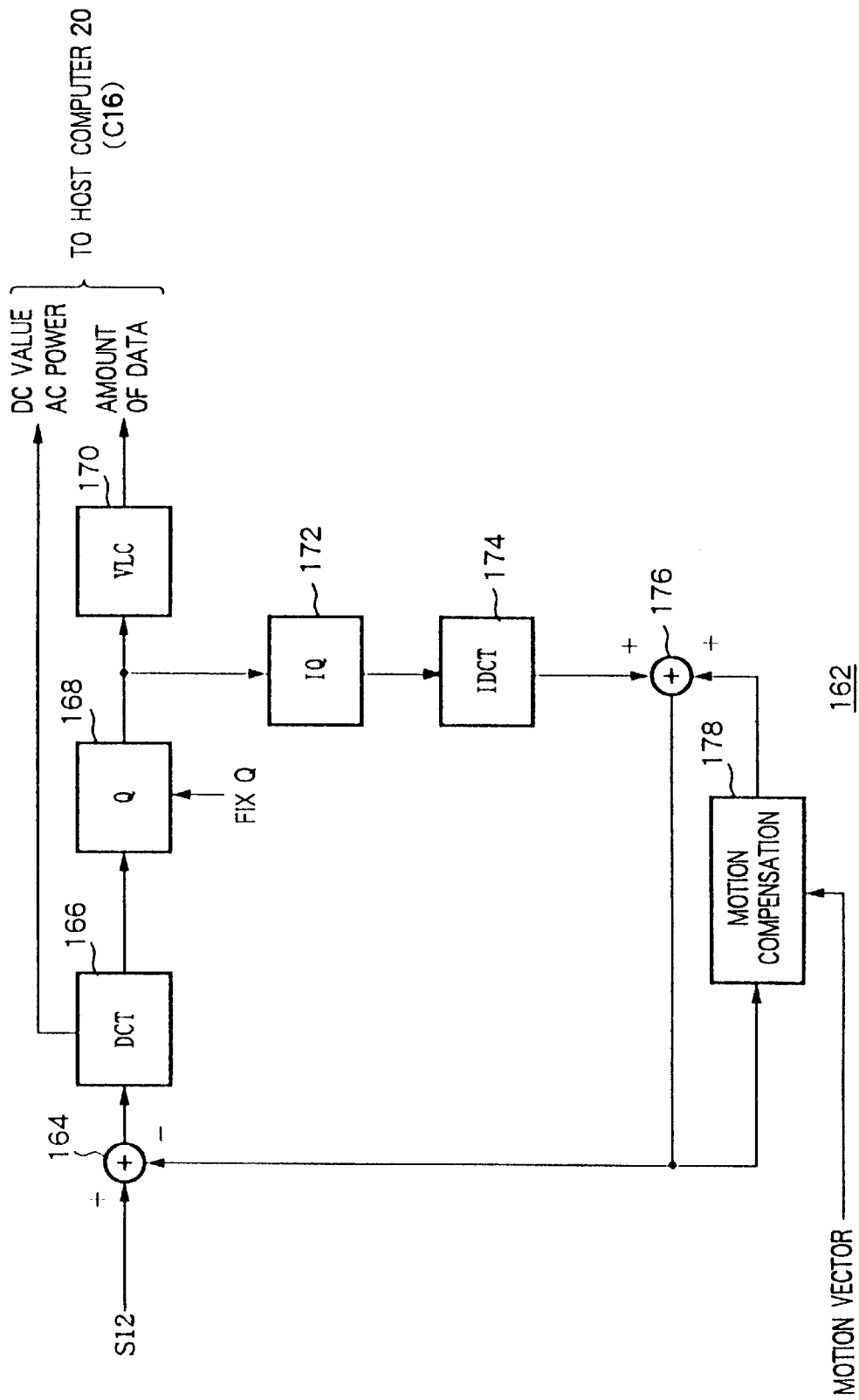
FIG. 2 is a view of the configuration of an encoder of a simplified two pass processing unit shown in FIG. 1.

FIG. 2 is a view of the configuration of the encoder 162 of the simplified two pass processing unit 16 shown in FIG. 1.

The encoder 162 is a general video data use compression and coding unit constituted by, for example, as shown in FIG. 2, an adder circuit 164, a DCT circuit 166, a quantization circuit (Q) 168, a variable length coding circuit (VLC) 170, an inverse quantization circuit (IQ) 172, an inverse DCT (IDCT) circuit 174, an adder circuit 176, and a motion compensation circuit 178, compresses and codes the input video data S12 by the MPEG system or the like, and outputs the amount of data etc. for every picture of the compressed video data to the host computer 20.

The adder circuit 164 subtracts the output data of the adder circuit 176 from the video data S12 and outputs the result to the DCT circuit 166.

The DCT circuit 166 performs discrete cosine transformation (DCT) processing on the video data input from the adder circuit 164 in units of macroblocks consisting of for example 16 pixels×16 pixels, transforms the same from data of the time domain to data of the frequency domain, and outputs the result to the quantization circuit 168. Further, the DCT circuit 166 outputs the value of the DC component of the video data after DCT and the power value of the AC component to the host computer 20.

The quantization circuit 168 quantizes the data of the frequency domain input from the DCT circuit 166 by the fixed quantization value Q and outputs the result as the quantized data to the variable length coding circuit 170 and the inverse quantization circuit 172.

The variable length coding circuit 170 performs variable length coding on the quantized data input from the quantization circuit 168 and outputs the amount of data of the compressed video data obtained as a result of the variable length coding via the control signal C16 to the host computer 20.

The inverse quantization circuit 172 performs inverse quantization on the quantized data input from the variable length coding circuit 168 and outputs the same as the inverse quantized data to the inverse DCT circuit 174.

The inverse DCT circuit 174 performs inverse DCT processing on the inverse quantized data input from the inverse quantization circuit 172 and outputs the result to the adder circuit 176.

The adder circuit 176 adds the output data of the motion compensation circuit 178 and the output data of the inverse DCT circuit 174 and outputs the result to the adder circuit 164 and the motion compensation circuit 178.

The motion compensation circuit 178 performs the motion compensation processing based on the motion vector input from the motion estimator 14 on the output data of the adder circuit 176 and outputs the result to the adder circuit 176.

Figure 3:
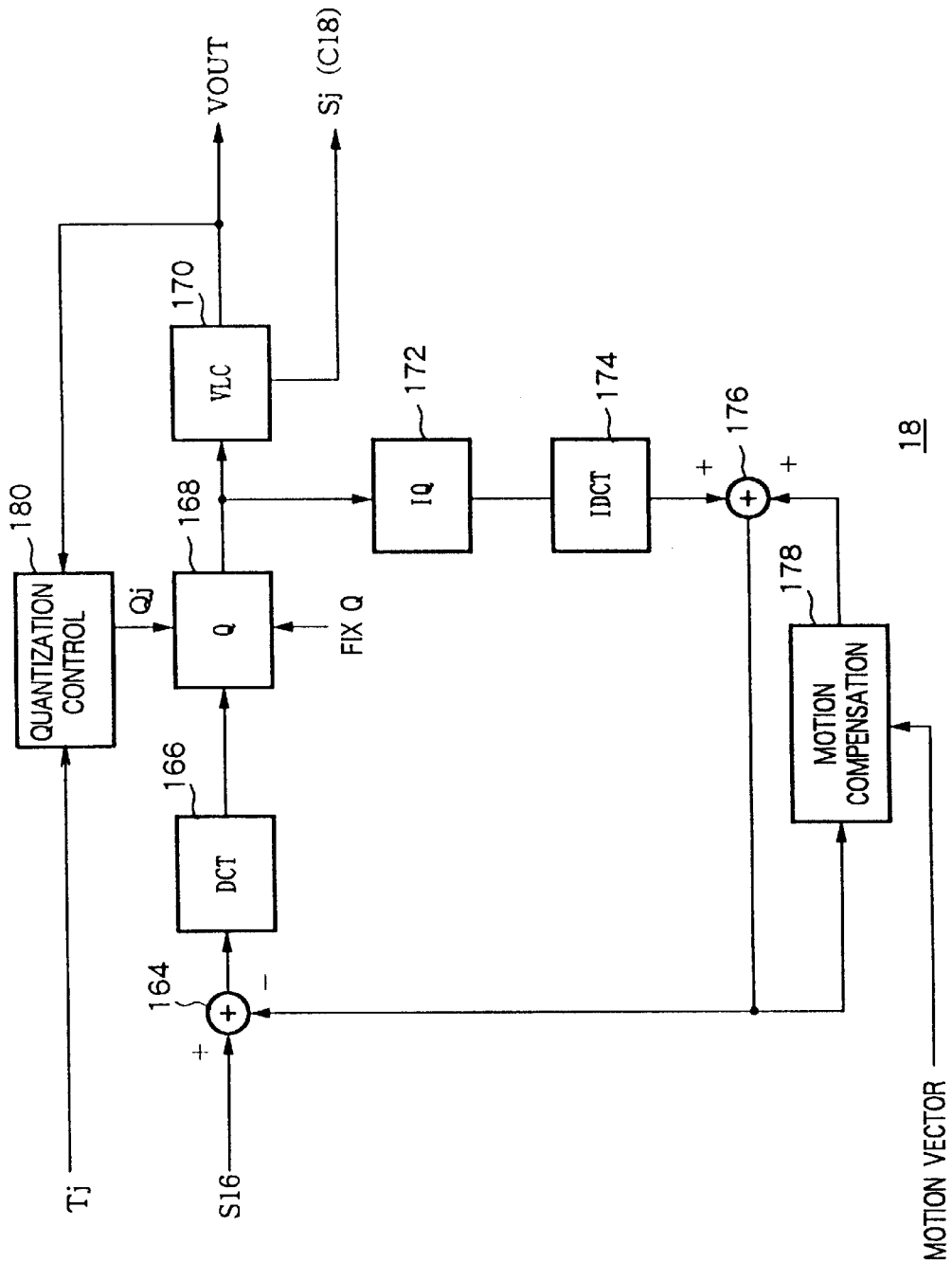
FIG. 3 is a view of the configuration of the encoder shown in FIG. 1.

FIG. 3 is a view of the configuration of the encoder 18 shown in FIG. 1.

As shown in FIG. 3, the encoder 18 is configured as the encoder 162 shown in FIG. 2 plus the quantization control circuit 180. The encoder 18 applies the motion compensation processing, DCT processing, quantization processing, and variable length coding processing with respect to the delayed video data S16 delayed by the amount of L pictures by the FIFO memory 160 by these constituent parts based on the target amount of data $T_j$ set from the host computer 20 to generate the compressed video data VOUT of the MPEG system or the like and outputs the result to an external apparatus (not illustrated).

In the encoder 18, the quantization control circuit 180 successively monitors the amount of data of the compressed video data VOUT output by the variable length quantization circuit 170 and successively adjusts the quantization value $Q_j$ to be set in the quantization circuit 168 so that the amount of data of the compressed video data finally generated from the j-th picture of the delayed video data S16 approaches the target amount of data $T_j$ set from the host computer 20.

Further, the variable length quantization circuit 170 outputs the compressed video data VOUT to the outside and in addition outputs the actual amount of data $S_j$ of the compressed video data VOUT obtained by compressing and coding the delayed video data S16 via the control signal C18 to the host computer 20.

Below, an explanation will be made of the simplified two pass encoding operation of the video data compression apparatus 1 in the first embodiment.

Figures 4A, 4B, 4C:
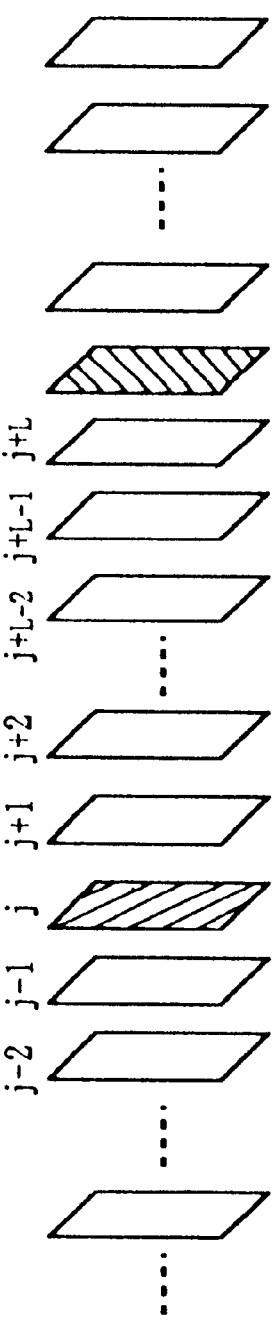
FIG. 4A to FIG. 4C are views of the operation of a simplified two pass encoding of the video data compression apparatus in the first embodiment.

FIGS. 4A to 4C are views of the operation of the simplified two pass encoding of the video data compression apparatus 1 in the first embodiment.

The encoder control unit 12 performs the preprocessing of rearrangement of pictures in the order of coding etc. with respect to the noncompressed video data VIN input to the video data compression apparatus 1 by the encoder control unit 12 and outputs the same as the video data S12 to the FIFO memory 160 and the encoder 162 as shown in FIG. 4A.

Note that, due to the rearrangement of the order of pictures by the encoder control unit 12, the order of coding of the pictures shown in FIG. 4A to FIG. 4C etc. and the order indicated after expansion and decoding are different.

The FIFO memory 160 delays the pictures of the input video data S12 by exactly the amount of L pictures and outputs the same to the encoder 18.

The encoder 162 preliminarily sequentially compresses and codes the pictures of the input video data S12 and outputs the amount of data of the compressed and coded data obtained by compressing and coding the j (j is an integer)-th picture, the value of the DC component of the video data after the DCT processing, and the power value of the AC component to the host computer 20.

For example, since the delayed video data S16 input to the encoder 18 is delayed by exactly the amount of L pictures by the FIFO memory 160, as shown in FIG. 4B, when the encoder 18 compresses and codes the j (j is an integer)-th picture (picture a of FIG. 4B) of the delayed video data S16, the encoder 162 compresses and codes the (j+L)-th picture (picture b of FIG. 4B) advanced from the j-th picture of the video data S12 by the amount of L pictures. Accordingly, when the encoder 18 starts the compression and coding of the j-th picture of the delayed video data S16, the encoder 162 has completed the compression and coding of the j-th to (J+L−1)-th pictures (range c of FIG. 4B) of the video data S12, and the real difficulty data $D_j, D_{j+1}, D_{j+2}, \cdots, D_{j+L-1}$ after compression and coding of these pictures have been already calculated by the host computer 20.

The host computer 20 calculates the target amount of data $T_j$ to be allocated to the compressed video data obtained by compressing and coding the j-th picture of the delayed video data S16 by the encoder 18 by the following Equation 1 and sets the calculated target amount of data $T_j$ in the quantization control circuit 180.

$$T_j = R'_j \times \frac{D_j}{\sum_{k=j}^{j+L-1} D_k} \quad (1)$$

Note, in Equation 1, $D_j$ is the real difficulty data of the j-th picture of the video data S12, $R'_j$ is an average of the target amount of data which can be allocated to the j-th to the (j+L−1)-th pictures of the video data S12 and S16, and an initial value ($R'_1$) of $R'_j$ is the target amount of data which can be allocated to pictures of the compressed video data on the average, represented by following Equation 2, and updated as shown in Equation 3 whenever the encoder 18 generates one picture's worth of the compressed video data.

$$R'_1 = (Bit\_rate \times L)/Picture\_rate \quad (2)$$

$$R'_{j+1} = R'_j - S_j + F_{j+L} \quad (3)$$

Note that, the numerical value bit rate (Bit rate) in Equation 3 indicates the amount of data (amount of bits) per second determined based on the transmission capacity of the communication line and the recording capacity of the recording medium, "Picture rate" indicates the number of pictures per second contained in the video data (30 pictures/sec (NTSC), 25 pictures/sec (PAL)), and the numerical value $F_{j+L}$ indicates the average amount of data per picture determined in accordance with the picture type.

The DCT circuit 166 of the encoder 18 performs DCT processing on the j-th picture of the input delayed video data S16 and outputs the result to the quantization circuit 168.

The quantization circuit 168 quantizes the data of the frequency domain of the j-th picture input from the DCT circuit 166 by the quantization value $Q_j$ adjusted based on the target amount of data $T_j$ by the quantization control circuit 180 and outputs the result as the quantized data to the variable length coding circuit 170.

The variable length coding circuit 170 performs variable length coding on the quantized data of the j-th picture input from the quantization circuit 168 so as to generate the compressed video data VOUT of an amount of data near the target amount of data $T_j$ and outputs the same.

Similarly, as shown in FIG. 4B, when the encoder 18 compresses and codes the (j+1)-th picture (picture a' of FIG. 4C) of the delayed video data S16, the encoder 162 completes the compression and coding of the (j+1)-th to (j+L)-th pictures (range c' of FIG. 4C) of the video data S12. The real difficulty data $D_{j+1}, D_{j+2}, D_{j+3}, \cdots, D_{j+L-1}$ of these pictures have been already calculated by the host computer 20.

The host computer 20 calculates the target amount of data $T_{j+1}$ to be allocated to the compressed video data obtained by compressing and coding the (j+1)-th picture of the delayed video data S16 by the encoder 18 by Equation 1 and sets the same in the quantization control circuit 180 of the encoder 18.

The encoder 18 compresses and codes the (j+1)-th picture based on the target amount of data $T_j$ set in the quantization control circuit 180 from the host computer 20 so as to generate the compressed video data VOUT of an amount of data near the target amount of data $T_{j+1}$ and outputs the same.

Further, below, similarly, the video data compression apparatus 1 successively compresses and codes the k-th picture of the delayed video data S16 by changing the quantization value $Q_k$ (k=j+2, j+3, $\cdots$) for every picture and outputs the result as the compressed video data VOUT.

As explained above, according to the video data compression apparatus 1 shown in the first embodiment, the difficulty of the pattern of the noncompressed video data VIN can be calculated in a short time and the noncompressed video data VIN can be adaptively compressed and coded with a compression rate in accordance with the calculated difficulty. That is, according to the video data compression apparatus 1 shown in the first embodiment, the noncompressed video data VIN can be adaptively compressed and coded in almost real time based on the difficulty of the pattern of the noncompressed video data VIN unlike the two pass encoding system, and thus the apparatus can be applied to applications such as live broadcasts in which a real time property is required.

Note that, in addition to that shown in the first embodiment, the video data compression apparatus 1 according to the present invention can adopt various other configurations, for example, the amount of data of the compressed video data compressed and coded by the encoder 162 may be used as it is as the difficulty data so as to simplify the processing of the host computer 20.

Second Embodiment

Below, a second embodiment of the present invention will be explained.

The simplified two pass encoding system shown in the first embodiment is an excellent system with which the compression and coding can be carried out by merely giving a delay of an amount of about one GOP (for example 0.5 second) to the noncompressed video data input and the compressed video data of a suitable amount of data can be generated.

However, these systems require two encoders. In general, the encoder for compressing and coding the video data requires a large scale hardware and is very expensive even if it is formed as an integrated circuit, and in addition the size is large. Accordingly, that these systems require two encoders prevents the lowering of costs and reduction of size of the apparatus for realizing these systems and saving of the electric power. Further, it is more desirable that the time delay required for the compression and coding be shorter, but the calculation processing of the real difficulty data $D_j$ and the predictive difficulty data $D_j'$ and the preliminary compression and coding processing per se require a few pictures' worth of processing time, therefore these processings per se become a cause of preventing the shortening of the time delay.

The second embodiment was made so as to solve such a problem and has as an object thereof to provide a video data compression system with which compressed video data of a suitable amount of data can be generated equivalently to the simplified two pass encoding system by merely using one encoder and in addition the time delay required for processing is shorter.

Figure 5:
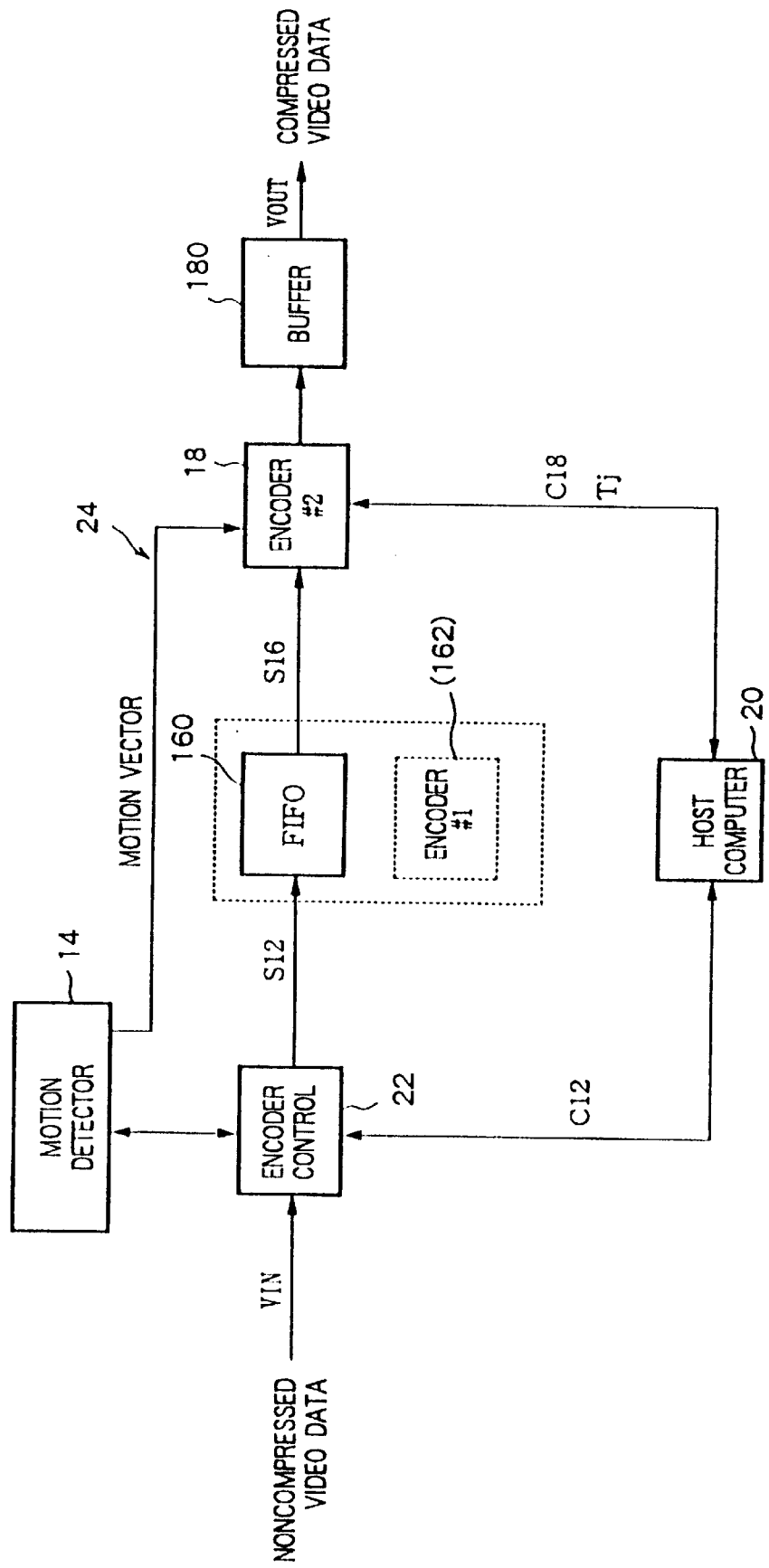
FIG. 5 is a view of a schematic configuration of the video data compression apparatus according to the present invention in a second embodiment.

FIG. 5 is a view of a schematic configuration of a video data compression apparatus 2 according to the present invention in the second embodiment.

Figure 6:
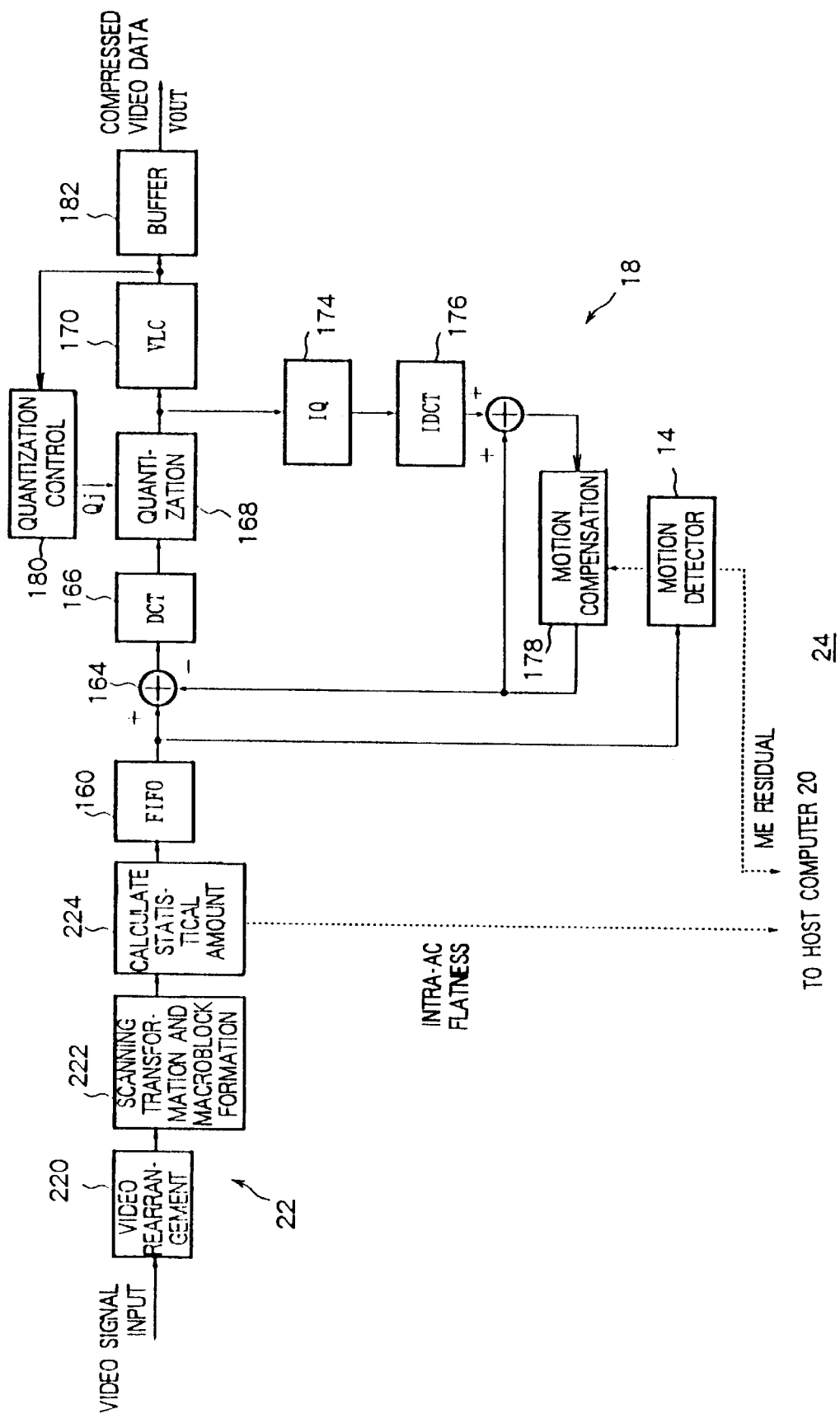
FIG. 6 is a view of a detailed configuration of a compression and coding unit of the video data compression apparatus shown in FIG. 5.

FIG. 6 is a view of a detailed configuration of a compression and coding unit 24 of the video data compression apparatus 2 shown in FIG. 5.

Note that, in FIG. 5 and FIG. 6, the same references are attached to the same constituent parts as those of the video data compression apparatus 1 (FIG. 1, FIG. 2) explained in the first embodiment among the constituent parts of the video data compression apparatus 2.

As shown in FIG. 5, the video data compression apparatus 2 adopts a configuration in which the compression and coding unit 10 of the video data compression apparatus 1 (FIG. 1, FIG. 2) is substituted with a compression and coding unit 24 obtained by removing the encoder 162 from the compression and coding unit 10, the encoder control unit 12 is substituted with the encoder control unit 22, and a buffer memory (buffer) 182 is added.

As shown in FIG. 6, the compression and coding unit 24 is constituted by a video rearrangement circuit 220, a scanning transform macroblock forming circuit 222, and a statistical amount calculation circuit 224. The other constituent parts of the compression and coding unit 24 adopt the same configuration as that of the compression and coding unit 10.

The encoder control unit 22 notifies the existence of a picture of the noncompressed video data VIN to the host computer 20 similar to the encoder control unit 12 and further performs the preprocessing for the compression and coding for every picture of the noncompressed video data VIN.

In the encoder control unit 22, the video rearrangement circuit 220 rearranges the input noncompressed video data in order of the coding.

The scanning transform macroblock forming circuit 222 performs the picture field transformation and performs the 3:2 pull down processing etc. where the noncompressed video data VIN is the video data of a movie.

The statistical amount calculation circuit 224 calculates the statistical amounts such as the flatness and the intra AC from the picture which is processed by the video rearrangement circuit 220 and the scanning transform macroblock forming circuit 222 and compressed and coded to an I picture.

The video data compression apparatus 2 adaptively calculates the target amount of data $T_j$ similar to the video data compression apparatus 1 (FIG. 1, FIG. 2) by using the statistical amount of the noncompressed video data (flatness and intra AC) and the predictive difference amount (ME residual) of the motion prediction in place of the difficulty of pattern of the noncompressed video data VIN by these constituent parts and performs high precision feed forward control, thereby to compress and code the noncompressed video data VIN to the compressed video data of an adequate amount of data.

Note that, in the video data compression apparatus 2, the target amount of data $T_j$ is determined based on indicator data detected in advance by the motion estimator 14 and the statistical amount calculation circuit 224 of the encoder control unit 22, therefore the compression and coding system in the video data compression apparatus 2 will be referred to as a feed forward rate control (FFRC) system below.

Note that, the ME residual is defined as an absolute value sum or square value sum of a differential value of the video data of the picture to be compressed and the reference picture and is calculated from the pictures which become the P picture and the B picture after the compression by the motion estimator 14, represents the speed of the motion of the video and the complexity of the pattern, and has the correlation with the difficulty and the amount of data after compression similar to the flatness.

The I picture is compressed and coded without reference to other pictures, therefore the ME residual can not be found and thus the flatness and the intra AC are used as the parameters in place of the ME residual.

Further, the flatness is the parameter newly defined as the indictor representing the spatial flatness of the video so as to realize the video data compression apparatus 2 and indicates the complexity of the video and has a correlation with the difficulty (degree of difficulty) of the pattern of the video and the amount of data after compression.

Further, the intra AC is a parameter newly defined as the sum of dispersion values with the video data for every DCT block of the DCT processing unit in the MPEG system so as to realize the video data compression apparatus 2, indicates the complexity of the video, and has correlation with the difficulty of the pattern of the video and the amount of data after the compression in similar to the flatness.

Below, an explanation will be made of the ME residual, flatness, and the intra AC.

In the simplified two pass encoding system explained in the first embodiment, the real difficulty data $D_j$ indicates the difficulty of the pattern of the video, and the target amount of data $T_j$ is calculated based on the real difficulty data $D_j$.

Further, the control of the quantization value $Q_j$ is carried out in the quantization circuit 168 (FIG. 2, FIG. 6) so as to make the amount of data of the compressed video data generated by the encoder 18 approach the value indicated by the target amount of data $T_j$. Accordingly, if a parameter which can be obtained without performing the compression and coding of the video data and adequately indicates the complexity (difficulty) of the pattern of the video data similar to the real difficulty data $D_j$ can be obtained before the quantization processing in the quantization circuit 168 of the encoder 18, the object of the encoder 162 (FIG. 1) being eliminated omitted and the processing delay time being shortened can be achieved. The ME residual, the flatness, and the intra AC have a strong correlation with the real difficulty data $D_j$, therefore are suitable so as to achieve such an object.

Relationship of the ME Residual and Real Difficulty data $D_j$

When performing the compression and coding processing by referring to another picture and generating a P picture and B picture, the motion estimator 14 finds the motion vector so that the absolute value sum or square value sum of the differential values between the picture (input picture) to be compressed and the picture to be referred to (reference picture) becomes the smallest. The ME residual is defined as the electric power of the difference component between two pictures when finding the motion vector.

Figure 7:
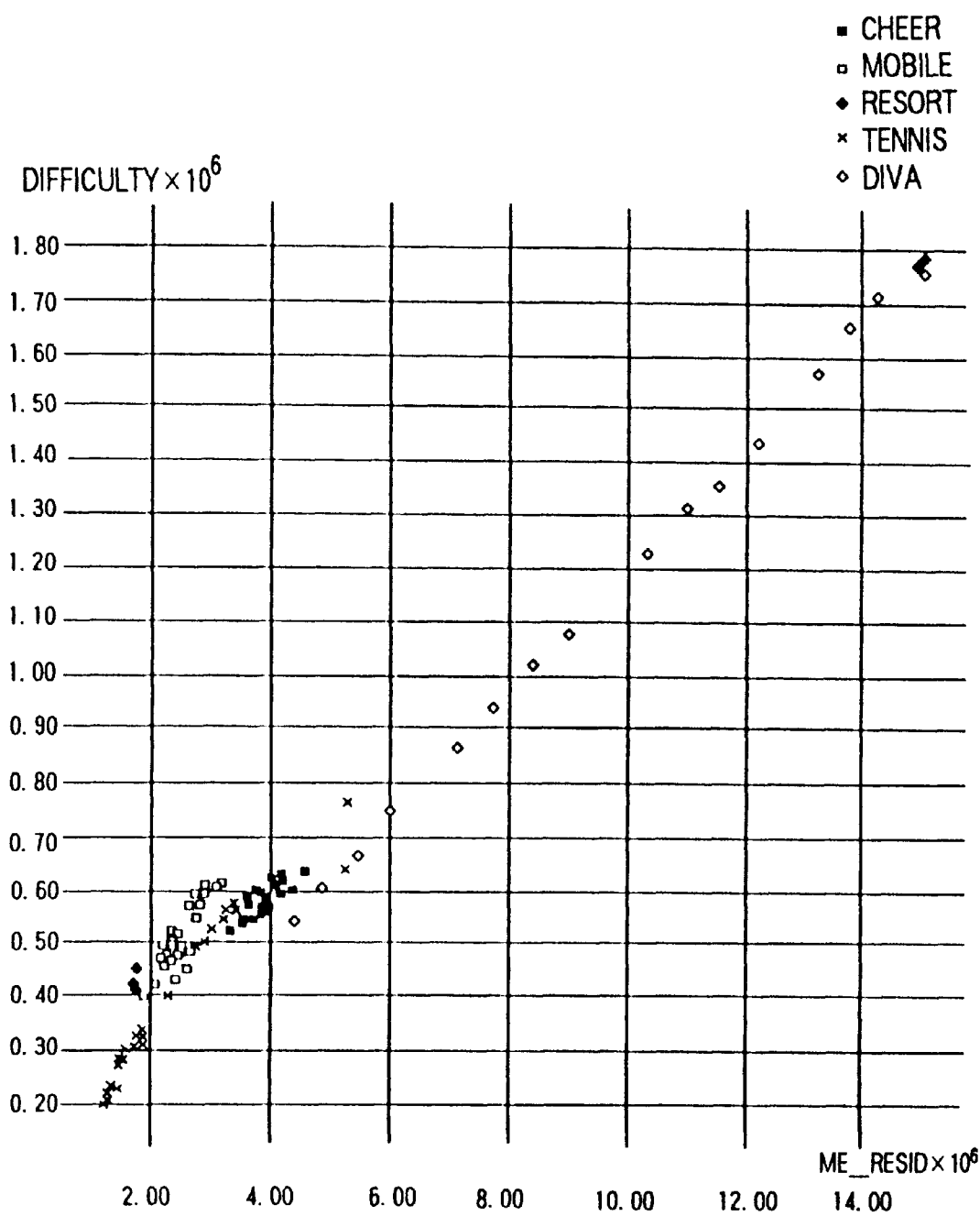
FIG. 7 is a view of the correlation of an ME residual and the real difficulty data $D_j$ when generating a P picture by the video data compression apparatus shown in FIG. 1 and FIG. 5.

FIG. 7 is a view showing the correlation of the ME residual and the real difficulty data $D_j$ when generating a P picture by the video data compression apparatuses 1 and 2.

Figure 8:
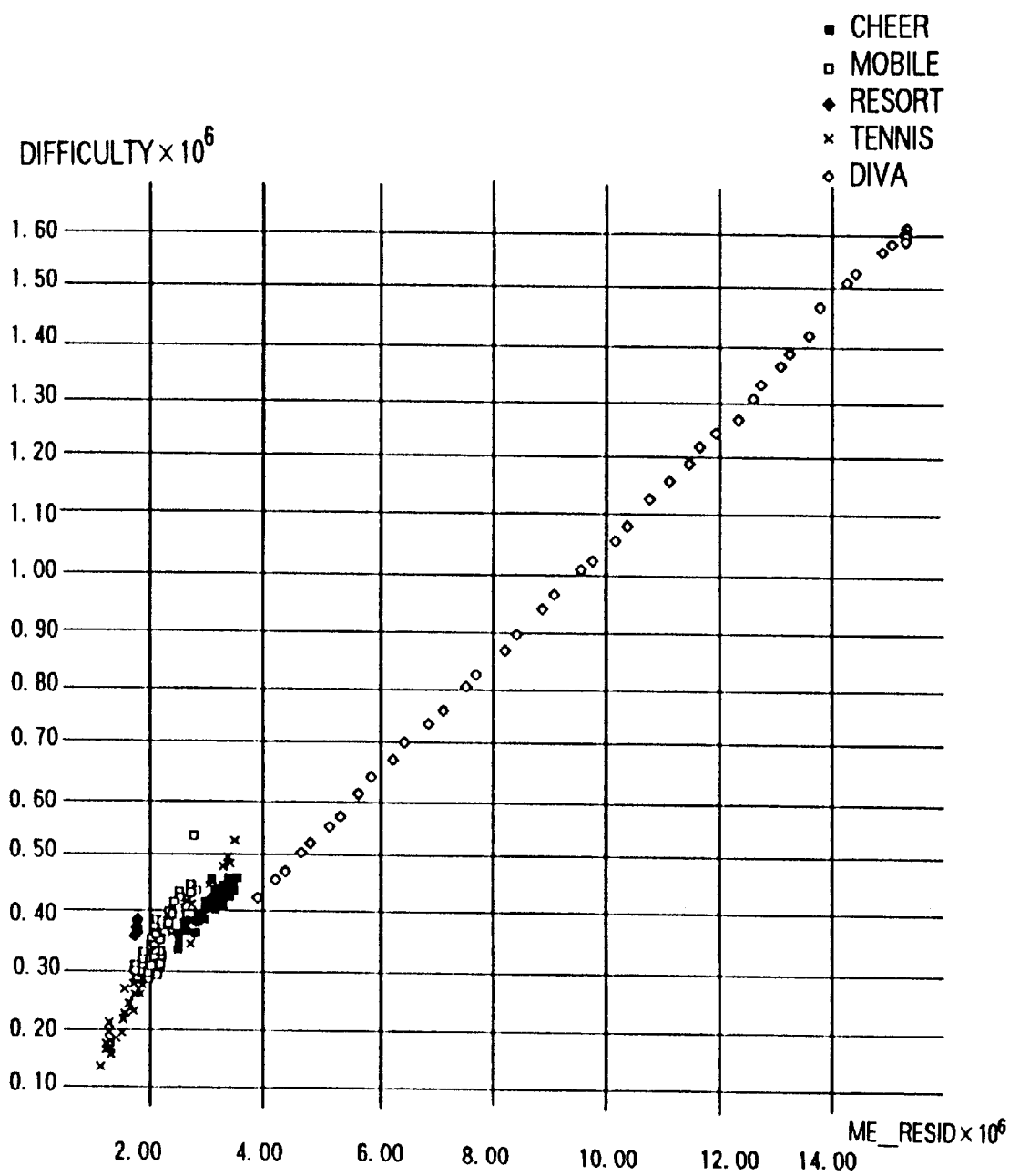
FIG. 8 is a view of the correlation of the ME residual and the real difficulty data $D_j$ when generating a B picture by the video data compression apparatus shown in FIG. 1 and FIG. 5.

FIG. 8 is a view of the correlation of the ME residual and the real difficulty data $D_j$ when generating a B picture by the video data compression apparatuses 1 and 2.

Note that, FIG. 7 and FIG. 8 are graphs showing the relationship of the ME residual and the real difficulty data $D_j$ obtained where standard images [cheer (cheer leaders), mobile (mobile and calendar), tennis (table tennis), diva (diva with noise)] and other images (resort) standardized by CCIR are actually compressed and coded by the MPEG2 system. In FIG. 7 and FIG. 8, an ordinate (difficulty) of graph indicates the real difficulty data $D_j$, and an abscissa (me resid) indicates the ME residual.

As is understood by referring to FIG. 7 and FIG. 8, the ME residual has a very strong correlation with the real difficulty data $D_j$. Accordingly, the ME residual can be used for the generation of the target amount of data $T_j$ place of the real difficulty data $D_j$ of the picture which becomes the P picture or the B picture after the compression.

Relationship between Flatness and Real Difficulty data $D_j$

Figure 9:
FIG. 9 is a view of a method of calculation of flatness.

FIG. 9 is a view of the method of calculation of the flatness.

The flatness is calculated by dividing each of the DCT blocks which serve as the units of DCT processing in the MPEG system into small blocks each consisting of 2 pixels×2 pixels as shown in FIG. 9, calculating the difference of the data of the diagonal pixels (pixel values) in these small blocks, comparing the difference with a predetermined threshold value, and further finding the sum of small blocks in which the difference becomes smaller than the threshold value for every picture.

Note that the value of the flatness becomes smaller as the pattern of the video becomes spatially more complex and becomes larger when it is flatter.

Figure 10:
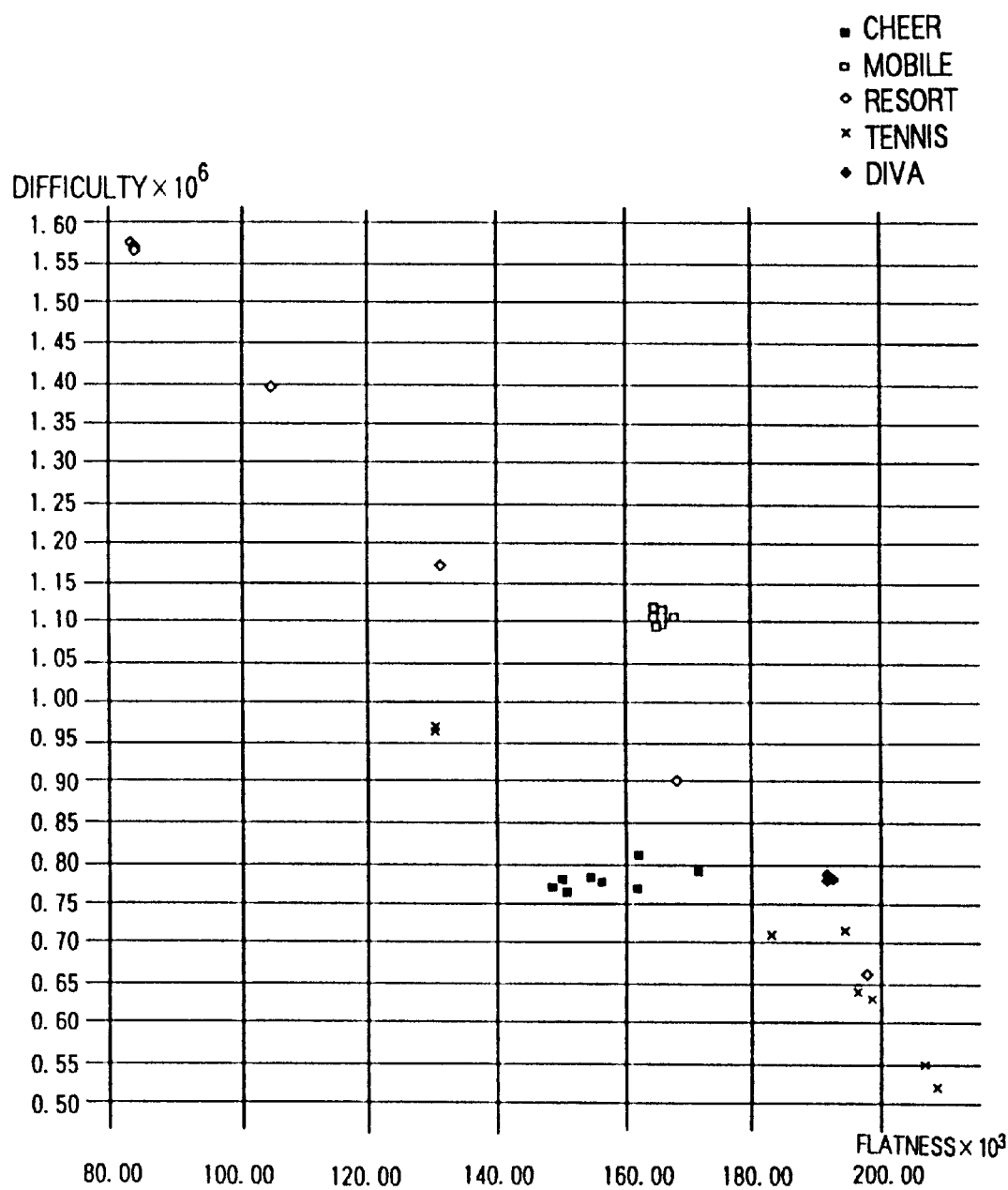
FIG. 10 is a view of the correlation of the flatness and the real difficulty data $D_j$ when generating an I picture by the video data compression apparatus shown in FIG. 1 and FIG. 5.

FIG. 10 is a view of the correlation between the flatness and the real difficulty data $D_j$ when generating an I picture by the video data compression apparatuses 1 and 2.

Note that, FIG. 10, like FIG. 7 and FIG. 8, is a graph of the relationship between the flatness and the real difficulty data $D_j$ obtained when the standard images standardized by the CCIR and other images are actually compressed and coded by the MPEG system. In FIG. 10, the ordinate of the graph (difficulty) indicates the real difficulty data $D_j$, and the abscissa (flatness) indicates the flatness.

As shown in FIG. 10, there is a strong negative correlation between the flatness and the real difficulty data $D_j$, and it is seen that the real difficulty data $D_j$ can be approximated by the method of substituting the flatness into the primary function etc.

Relationship Between Intra AC and Real Difficulty Data $D_j$

The intra AC is calculated as the sum of the absolute values of the difference between the pixel value of each pixel in a DCT block and the average value of the pixel values in the DCT block for every DCT block. That is, the intra AC can be found by the following Equation 4

$$\text{Intra-AC}_j = \sum_{picture} \sum_{k=1}^{64} |P_k - \overline{P}| \qquad (4)$$

$$\overline{P} = \frac{1}{64} \sum_{k=1}^{64} P_k$$

Figure 11:
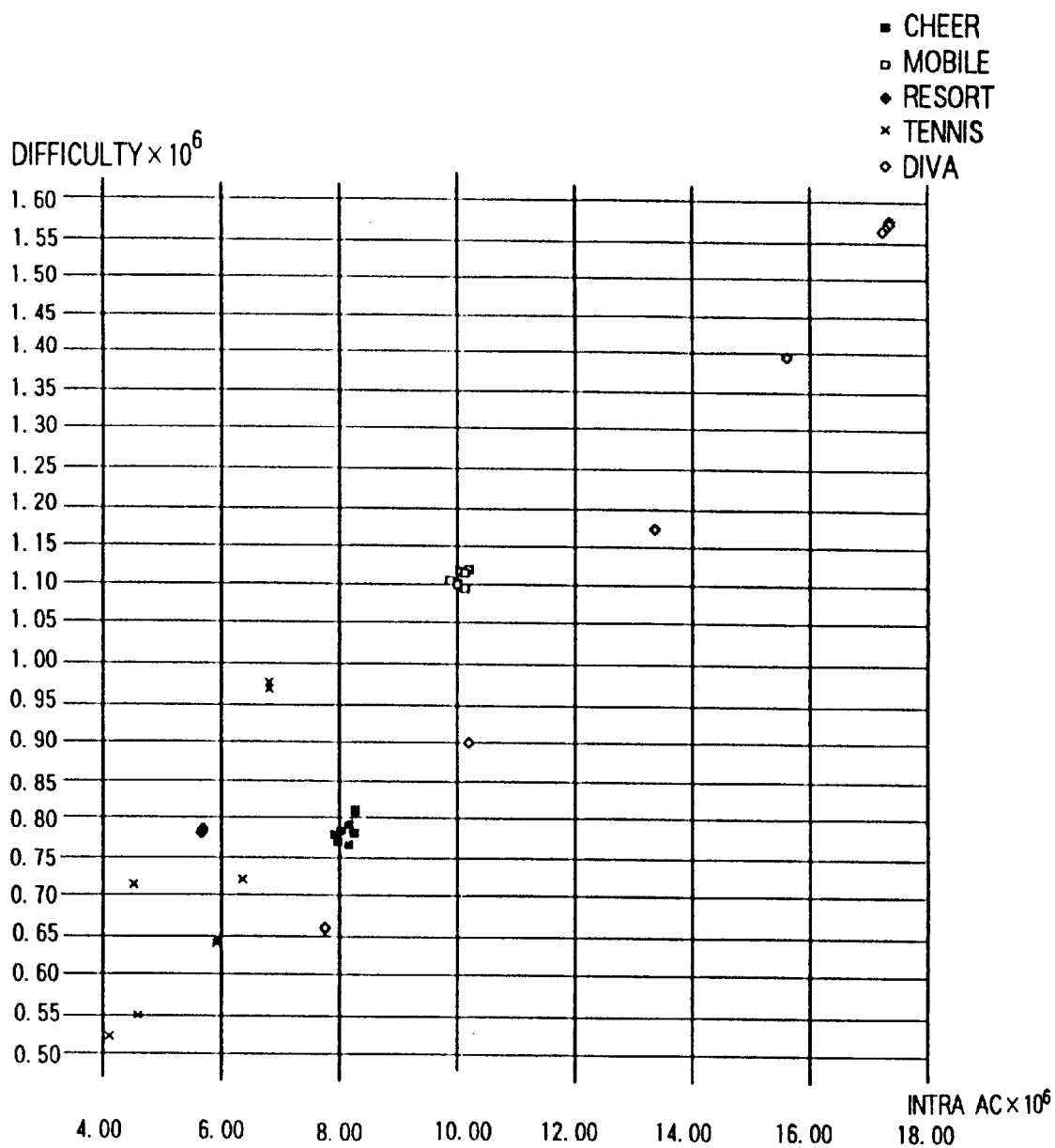
FIG. 11 is a view of the correlation of the intra AC and the real difficulty data $D_j$ when generating an I picture by the video data compression apparatus shown in FIG. 1 and FIG. 5.

FIG. 11 is a view of the correlation between the intra AC and real difficulty data $D_j$ when generating an I picture by the video data compression apparatuses 1 and 2.

Note that, FIG. 22, like FIG. 7 and FIG. 8, is a graph showing the relationship between the intra AC and the real difficulty data $D_j$ obtained where the standard images standardized by the CCIR and other images are actually compressed and coded by the MPEG system. In FIG. 11, the ordinate of the graph (difficulty) indicates the real difficulty data $D_j$, and the abscissa (intra AC) indicates the intra AC.

As shown in FIG. 11, it is seen that there is a strong correlation between the infra AC and the real difficulty data $D_j$ and that it is possible to calculate the real difficulty data $D_j$ of each picture type by the substitution of the infra AC in the primary functions.

The real difficulty data $D_j$ is approximated by the ME residual ($ME_j$) by the following Equation 5 for a P picture and by the following Equation 6 for a B picture. Further, the real difficulty data $D_j$ is approximated by the flatness and intra AC or either of them by approximation equations similar to Equations 5 and 6 for an I picture.

$$D_j = a_P \times ME_j + b_P \qquad (5)$$

$$D_j = a_B \times ME_j + b_B \qquad (6)$$

Further, in the simplified two pass encoding system shown in the first embodiment, the target amount of data $T_j$ was calculated by substituting the real difficulty data $D_j$ obtained by these approximations into Equation 1.

Below, the operation of the video data compression apparatus 2 will be explained by taking as an example a case where the real difficulty data $D_j$ is approximated by the ME residual, the flatness, and the intra AC and the noncompressed video data is compressed and coded by the simplified two pass encoding system.

In the encoder control unit 22, the image rearranging circuit 220 rearranges the noncompressed video data VIN in pictures in the order of coding. The scanning transformation and macroblock forming circuit 222 performs the picture field transformation etc. The statistical amount calculation circuit 224 performs the computation processing shown in FIG. 20 and Equation 4 with respect to a picture to be compressed and coded to an I picture and calculates a statistical amount such as the flatness and intra AC.

The motion estimator 14 generates motion vectors for the pictures to be compressed and coded to a P picture and B picture and further calculates the ME residual.

The FIFO memory 160 delays the input video data by exactly an amount of L pictures.

The host computer 20 performs the computation processing shown in Equation 5 and Equation 6 with respect to the ME residual generated by the motion estimator 14 to approximate the real difficulty data $D_j$ and performs the computation processing similar to Equation 5 and Equation 6 to approximate the real difficulty data $D_j$ by the flatness and the intra AC.

Further, the host computer 20 substitutes the approximated real difficulty data $D_j$ Equation 1 to calculate the target amount of data $T_j$ and sets the calculated target amount of data $T_j$ in the quantization control circuit 180 of the encoder 18.

The DCT circuit 166 of the encoder 18 performs DCT processing on the j-th picture of the delayed video data.

The quantization circuit 168 quantizes the data of the frequency domain of the j-th picture input from the DCT circuit 166 by the quantization value $Q_j$ adjusted by the quantization control circuit 180 based on the target amount of data $T_j$.

The variable length coding circuit 170 performs variable length coding on the quantized data of the j-th picture input from the quantization circuit 168, generates the compressed video data VOUT of an amount of data near the target amount of data $T_j$, and outputs the same via the buffer memory 182 to an external unit.

Note that, in the TM5 system etc. of the MPEG, to calculate the quantization value of the macroblock (MQUANT), a statistical amount such as the "activity" shown in the following Equation 7 is used. The activity has a strong correlation with the real difficulty data $D_j$ similar to the flatness and the intra AC, therefore it is also possible to constitute the video data compression apparatus 2 so as to perform the compression and coding by approximating the real difficulty data $D_j$ using the activity in place of these parameters.

$$act_j = 1 + \min_{sblk=1\,to\,4}(var_{sblk}) \qquad (7)$$

$$var_{sblk} = \sum_{j=1}^{64} (P_j - \overline{P})^2$$

Further, modifications similar to those with respect to the video data compression apparatus 1 shown in the first embodiment are also possible with respect to the video data compression apparatus 2 shown in the second embodiment.

Third Embodiment

Below, a third embodiment of the present invention will be explained.

In the FFRC system shown in the second embodiment, the real difficulty data was approximated by substituting the statistically found indicator data (statistical amount), that is, the ME residual, flatness, intra AC, and activity into the primary function such as Equation 5 and Equation 6.

These indicator data and the real difficulty data $D_j$ have a strong correlation as shown in FIG. 7, FIG. 8, FIG. 10, and FIG. 2, but a slight difference occurs from the above primary function according to the pattern of the video data.

The processing of the video data compression apparatus 2 in the third embodiment is designed so as to solve such a problem and is enhanced so that the weighting coefficients $a_P$, $a_B$, $a_I$, $a_I'$, etc. shown in Equation 5 and Equation 6 etc. are adaptively adjusted every moment in accordance with the pattern etc. of the video data so that the real difficulty data $D_j$ can be approximated by the indicator data with a higher precision than that in the second embodiment and compressed video data having a higher quality can be produced.

Below, the processing of the video data compression apparatus 2 in the third embodiment will be briefly explained.

Whenever the encoder 18 of the video data compression apparatus 2 (FIG. 5) ends one picture's worth of compression and coding, the host computer 20 learns one picture's worth of the amount of data of the generated compressed video data and the average value of the quantization values $Q_j$ at the time of the compression and coding and the global complexity explained below can be calculated.

The global complexity is defined as shown in the following Equation 8-1 to Equation 8-3 as a value obtained by multiplying the amount of data of the compressed video data and the quantization value $Q_j$ in TM5 of the MPEG and indicates the complexity of the pattern of the image.

$$X_I = S_I \times Q_I \qquad (8\text{-}1)$$

$$X_P = S_P \times Q_P \qquad (8\text{-}2)$$

$$X_B = S_B \times Q_B \qquad (8\text{-}3)$$

Note that, in Equation 8-1 to Equation 8-3, $S_I$, $S_B$, and $S_P$ indicate the generated amounts of data of the I picture, B picture, and P picture, $Q_I$, $Q_B$, and $Q_P$ indicate the average values of the quantization values $Q_j$ when producing the I picture, B picture, and P picture, and $X_I$, $X_B$, and $X_P$ indicate the global complexity of the I picture, B picture, and P picture, respectively.

The global complexities shown in Equation 8-1 to Equation 8-3 do not always coincide with the real difficulty data $D_j$, but substantially coincide with the real difficulty data $D_j$ so far as the average value of the quantization values $Q_j$ is not extremely large or small.

Here, when the indicator data of the I picture, P picture, and the B picture, for example the intra AC (other parameter is also possible) and ME residual, and the global complexity have a proportional relationship, the proportional coefficients $\epsilon^I$, $\epsilon^P$, and $\epsilon^B$ between these indicator data and global complexity can be calculated by following Equation 9-1 to Equation 9-3.

Case of $I$ picture $\qquad (9\text{-}1)$ $$\varepsilon_j^I = \frac{X_I}{\text{Intra\_AC}}$$

Case of $P$ picture $\qquad (9\text{-}2)$ $$\varepsilon_j^P = \frac{X_P}{\text{ME\_resid}}$$

Case of $B$ picture $\qquad (9\text{-}3)$ $$\varepsilon_j^B = \frac{X_B}{\text{ME\_resid}}$$

The real difficulty data $D_j$ each picture type is calculated as shown in following Equation 9-1 to Equation 9-3 by using the proportional coefficients $\epsilon^I$, $\epsilon^P$, and $\epsilon^B$ calculated by Equation 10-1 to Equation 10-3.

Case of I picture $$D_j^I = \epsilon_j^I \times \text{Intra\_AC}_j \qquad (10\text{-}1)$$

Case of P picture $$D_j^P = \epsilon_j^P \times \text{ME\_resid}_j \qquad (10\text{-}2)$$

Case of B picture $$D_j^B = \epsilon_j^B \times \text{ME\_resid}_j \qquad (10\text{-}3)$$

The host computer 20 calculates and optimizes the proportional coefficients $\epsilon^I$, $\epsilon^P$, and $\epsilon^B$ whenever the encoder 18 compresses and codes one picture as shown in Equation 9-1 to Equation 9-3 and finds the values of the real difficulty data $D_j$ of picture types by Equation 10-1 to Equation 10-3, whereby the real difficulty data $D_j$ can be always optimally approximated by the indicator data irrespective of the pattern of the video data.

The host computer 20 performs the computation processing shown in Equation 1 or Equation 4 with respect to the real difficulty data $D_j$ approximated as shown in Equation 9-1 to Equation 9-3 and Equation 10-1 to Equation 10-3 to calculate the target amount of data $T_j$.

Note that, as in TM5 of the MPEG, when the value of the target amount of data $T_j$ to be actually calculated is intentionally changed by a constant ratio with respect to the value determined based on the real difficulty data $D_j$, the target amount of data $T_j$ can be calculated by the following Equation 11-1 to Equation 11-3:

Case of $I$ picture $\qquad (11\text{-}1)$ $$T_j = \frac{K_P \times K_B \times D_j}{K_P \times K_B \times D_I + K_B \times \sum_{\text{P\_picture}} D_P + K_P \times \sum_{\text{B\_picture}} D_B} \times R_j$$

Case of $P$ picture $\qquad (11\text{-}2)$ $$T_j = \frac{K_B \times D_j}{K_P \times K_B \times D_I + K_B \times \sum_{\text{P\_picture}} D_P + K_P \times \sum_{\text{B\_picture}} D_B} \times R_j$$

Case of $B$ picture $\qquad (11\text{-}3)$ $$T_j = \frac{K_P \times D_j}{K_P \times K_B \times D_I + K_B \times \sum_{\text{P\_picture}} D_P + K_P \times \sum_{\text{B\_picture}} D_B} \times R_j$$

Note that, in all denominators of Equation 11-1 to Equation 11-3, $D_{I,P,B}$ indicates the real difficulty data $D_j$ approximated by the indicator data produced from L pictures' worth of the noncompressed video data buffered in the FIFO memory 160 before input to the encoder 18, and $R_j$ indicates the average value of the amounts of data which can be assigned to L pictures after the j-th picture.

Below, the content of the processing of the video data compression apparatus 2 according to the third embodiment will be explained referring to FIG. 12.

Figure 12:
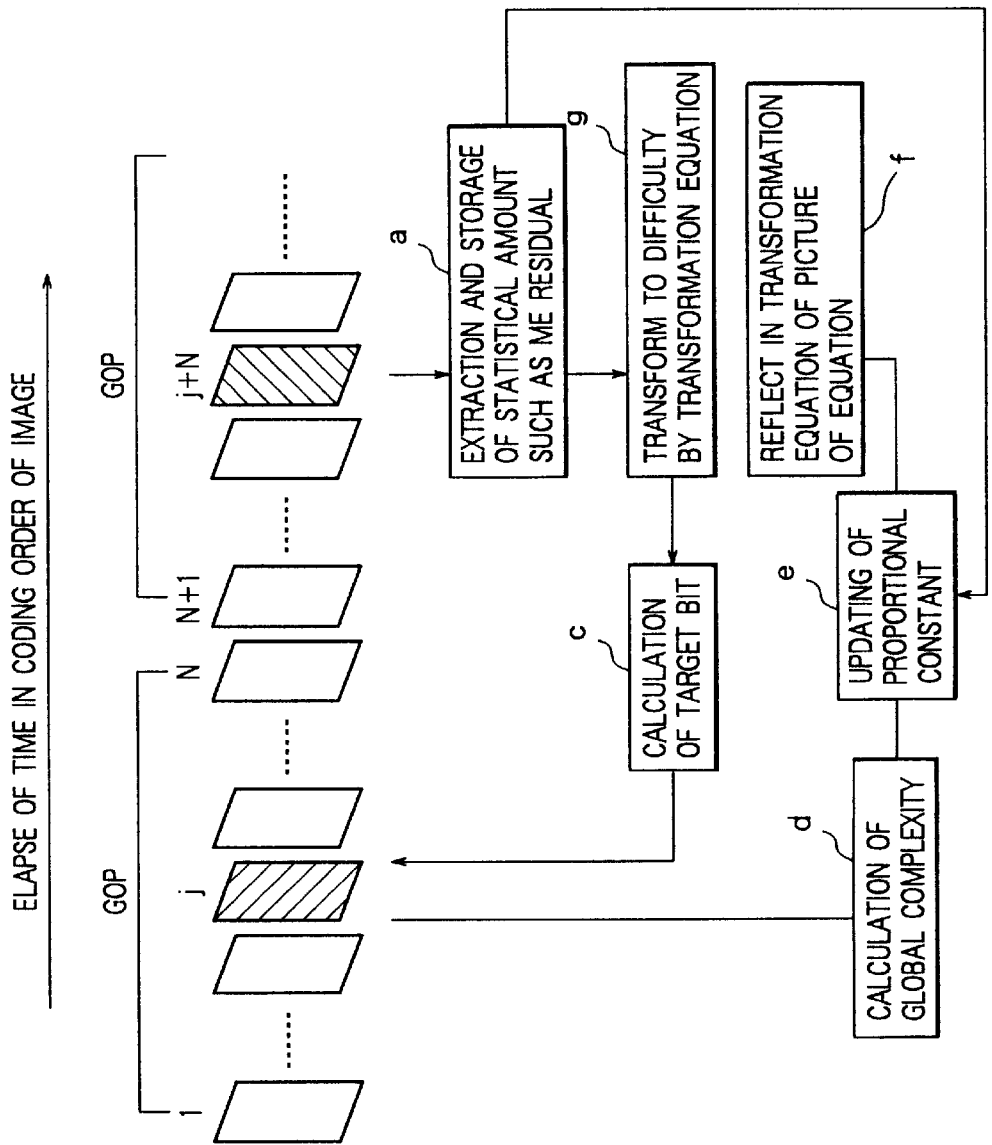
FIG. 12 is a view of the contents of the compression and coding processing of the video data compression apparatus (FIG. 6) in a third embodiment in order of coding of the pictures.

FIG. 12 is a view of the content of the compression and coding processing of the video data compression apparatus 2 (FIG. 5 and FIG. 6) in the third embodiment in the order of coding of the pictures.

The encoder control unit 22 rearranges the pictures of the noncompressed video data VIN in the order of coding similar to the second embodiment, performs the picture field transformation, etc. and calculates the statistical amount such as flatness and intra AC from the (j+L)-th picture to be compressed and coded to the I picture (explanation a of FIG. 12).

The motion estimator 14 produces a motion vector for the (j+L)-th picture to be compressed and coded to the P picture and B picture similar to that in the first embodiment and second embodiment and further calculates the ME residual (explanation a of FIG. 12).

The FIFO memory 160 delays the input video data by exactly the amount of L pictures similar to the first embodiment and the second embodiment.

The host computer 20 performs the computation processing shown in Equation 10-1 and 10-2 with respect to the ME residual produced by the motion estimator 14, approximates the real difficulty data $D_j$, performs the computation processing shown in Equation 10-3, and approximates the real difficulty data $D_j$ by the intra AC, etc. (explanation b of FIG. 12).

Further, the host computer 20 substitutes the approximated real difficulty data D into Equation 1 or Equations 11-1 to 11-3 to calculate the target amount of data $T_j$ and sets the same in the quantization control circuit 180 of the encoder 18 (explanation c of FIG. 12).

The DCT circuit 166 of the encoder 18 performs the DCT processing for the j-th picture of the delayed video data similar to that in the first embodiment and second embodiment.

The quantization circuit 168 quantizes the data of the frequency domain of the j-th picture input from the DCT circuit 166 by the quantization value $Q_j$ adjusted based on the target amount of data $T_j$ by the quantization control circuit 180 and, calculates the average value of the quantization values $Q_j$ used for the compression and coding of the j-th picture and outputs the same to the host computer 20.

The variable length coding circuit 170 performs variable length coding on the quantized data of the j-th picture input from the quantization circuit 168 similar to that in the first embodiment and second embodiment to produce the compressed video data VOUT of an amount of data near the target amount of data $T_j$ and outputs the same via the buffer memory 182.

When the encoder 18 terminates the compression and coding of the j-th picture, the host computer 20 calculates the global complexity as shown in Equation 8-1 to Equation 8-3 based on the average value of the quantization values $Q_j$ with respect to the j-th picture input from the quantization control circuit 180 and the amount of data of the compressed and coded j-th picture (explanation d of FIG. 12).

Further, the host computer 20 updates the proportional coefficients $\epsilon^I$, $\epsilon^P$, and $\epsilon^B$ as shown in Equation 9-1 to Equation 9-3 by the calculated global complexity (explanation e of FIG. 12).

The updated proportional coefficients $\epsilon^I$, $\epsilon^P$, and $\epsilon^B$ are reflected in the transformation equations at the time of compression and coding of the next picture (Equation 10-1 to Equation 10-3).

Figure 13:
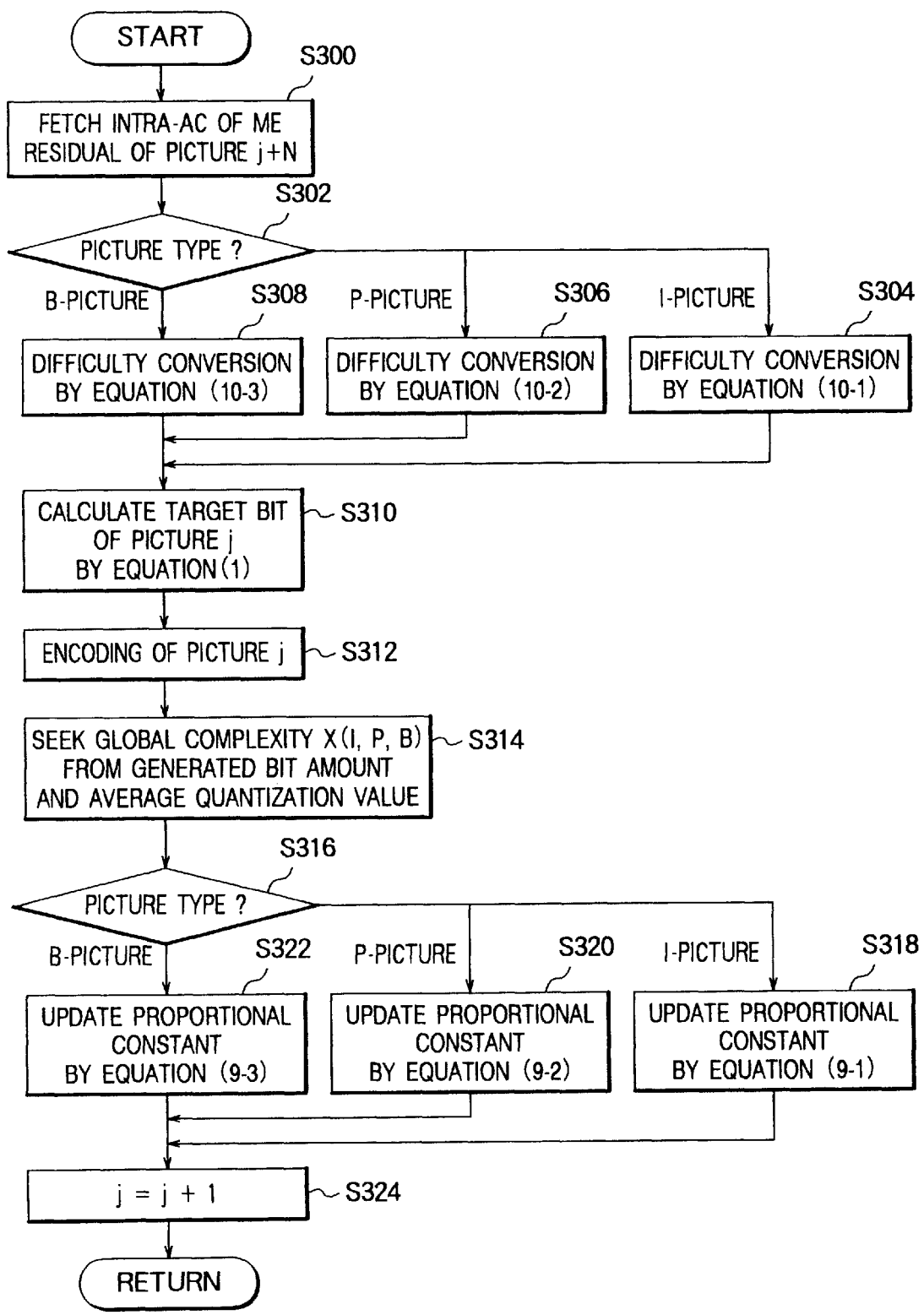
FIG. 13 is a flowchart of the content of the processing of the host computer (FIG. 6) of the video data compression apparatus in the third embodiment.

The content of the processing of the host computer 20 in the third embodiment will be further explained by referring to FIG. 13.

FIG. 13 is a flowchart of the content of the processing of the host computer 20 (FIG. 7) of the video data compression apparatus 2 in the third embodiment.

As shown in FIG. 13, at step 300 (S300), the host computer 20 fetches the (j+L)-th picture indicator data (statistical amount) such as ME residual or intra AC from the encoder control unit 22 or the motion estimator 14.

At step 302 (S302), the host computer 20 decides to which picture type the (j+L)-th picture is to be compressed and coded. When the (j+L)-th picture is to be compressed and coded to an I picture, the operation routine proceeds to the processing of S304; when it is to be compressed and coded to a P picture, the operation routine proceeds to the processing of S306; and when it is to be compressed and coded to a B picture, the operation routine proceeds to the processing of S308.

In each of step 304 (S304), step 306 (S306), and step 308 (S308), the host computer 20 approximates the real difficulty data $D_j$ by Equation 10-1 to Equation 10-3.

At step 310 (S310), the host computer 20 calculates the target amount of data $T_j$ by Equation 1 or Equation 11-1 to Equation 11-3 by using the approximated real difficulty data $D_j$.

At step 312 (S312), the encoder 18 compresses and codes the j-th picture.

At step 314 (S314), the host computer 20 calculates the global complexities $X_i$, $X_b$, and $X_p$ [X (I, B, P)] from the amount of data of the j-th picture compressed by the encoder 18 and the average value of the quantization values $Q_j$ set in the quantization circuit 168 by the quantization control circuit 180.

At step 316 (S316), the host computer 20 decides to which picture type the j-th picture is to be compressed and coded. Where the j-th picture is to be compressed and coded to an I picture, the operation routine proceeds to the processing of S318; when it is to be compressed and coded to a P picture, the operation routine proceeds to the processing of S320; and when it is to be compressed and coded to a B picture, the operation routine proceeds to the processing of S322.

In each of step 318 (S318), step 320 (S320)m and step 322 (S322), the host computer 20 updates the proportional coefficients $\epsilon^I$, $\epsilon^P$, and $\epsilon^B$ by Equation 9-1 to Equation 9-3.

At step 324 (S324), the host computer 20 increments the numerical value j.

Note that, as mentioned in the second embodiment, there is a case where an offset ($\delta^P$) exists between the real difficulty data $D_j$ and the multiplied value of the proportional coefficients $\epsilon^I$, $\epsilon^P$, and $\epsilon^B$ and the indicator data as shown in for example the following Equation 12. In such a case, as shown in the following Equation 13, by dividing the values obtained by subtracting the offset values $\delta^I$, $\delta^P$, and $\delta^B$ from the global complexities $X_i$, $X_b$, and $X_p$ by the indicator data, the proportional coefficients $\epsilon^I$, $\epsilon^P$, and $\epsilon^B$ can be calculated.

$$D_j^P = \varepsilon^P \times \text{ME\_resid}_j + \delta^P \tag{12}$$

$$\varepsilon^P = \frac{X_P - \delta^P}{\text{ME\_resid}_j} \tag{13}$$

Further, modifications similar to those shown in the second embodiment are also possible for the operation of the video data compression apparatus 2 shown in the third embodiment.

As mentioned above, according to the operation of the video data compression apparatus 2 in the third embodiment, the same effect as that by the operation of the video data compression apparatus 2 shown in the second embodiment is obtained and, in addition, a further correct target amount of data $T_j$ than that in the second embodiment can be calculated, and as a result, the quality of the compressed video data can be improved.

Fourth embodiment

Below, a fourth embodiment of the present invention will be explained.

In the first stage (step 1) of the processing of TM5 (test model 5) of the MPEG system etc., the target amounts of data $T_j$ to be allocated to pictures after compression are calculated by using the global complexities $X_I$, $X_P$, and $X_B$ [X (I, P, B)] shown in Equation 8-1 to Equation 8-3 (third embodiment).

When seeking the target amounts of data $T_j$ from the global complexities $X_I$, $X_P$, and $X_B$, Equation 11-1 to Equation 11-3 are used. In Equation 11-1 to Equation 11-3, so as to perform different weighting for the target amount of data $T_j$ for every type of pictures (picture type), coefficients such as $K_P$ and $K_B$ are introduced. As is understood by referring to Equation 11-1 to Equation 11-3, the larger the values of the weighting coefficients $K_P$ and $K_B$, the smaller the target amount of data $T_j$ of the P picture and the B picture in comparison with the target amount of data $T_j$ of the I picture.

For example, in the TM5 of the MPEG system, the weighting coefficients $K_P$ and $K_B$ are fixed values and are 1.0 and 1.4 ($K_P$=1.0, $K_B$=1.4, default value), respectively. That is, in the TM5 of the MPEG system, the target amount of data $T_j$ according to the ratio of the global complexity $X_P$ of the P picture with respect to the global complexity $X_I$ of the I picture is given to the P picture, and the target amount of data $T_j$ deliberately smaller than the ratio of the global complexity $X_B$ of the B picture with respect to the global complexity $X_I$ of the I picture is given to the B picture.

In many cases, by using the fixed weighting coefficients $K_P$ and $K_B$, the target amount of data $T_j$ of a suitable value is calculated with respect to each picture type. However, there is a possibility that the weighting coefficients $K_P$ and $K_B$ of the fixed value will no longer have optimum values according to a certain value of the data rate after compression and a certain pattern of the noncompressed video data.

On the other hand, in "Theory Analysis of MPEG Compression Efficiency and Application of Same to Code Amount Control" (Kofuji, Ota; Technical Research Report of The Institute of Electronics, Information and Communication Engineers, IE95-10, DSP95-10 (1995-04), p. 71 to p. 78; Document 1), it is reported that the quality of the compressed video data can be enhanced by optimizing the weighting coefficients $K_P$ and $K_B$ in accordance with the magnitude of motion of the noncompressed video data and the complexity of the pattern (Equation 11-1 to Equation 11-3; third embodiment). However, Document 1 does not disclose a method of altering the weighting coefficients $K_P$ and $K_B$ in accordance with the data rate of the compressed video data and the motion of the noncompressed video data.

Further, in actuality, where the data rate of the compressed video data can be made sufficiently high in value, where the target amount of data $T_j$ is found by using the default values as the values of the weighting coefficients $K_P$ and $K_B$, the quality of the compressed video data becomes best. On the other hand, where the data rate of the compressed video data can not be made sufficiently high in value, the quality of the compressed video data is more improved in the method of seeking the target amount of data $T_j$ by optimizing the weighting coefficients $K_P$ and $K_B$ in accordance with the magnitude of motion of the noncompressed video data and the complexity of the pattern.

Concretely, for example, when video data having a simple pattern though the motion is large is compressed and coded, the quality of the compressed video data is consequently more improved in the case where the default values are adopted than the case where the weighting coefficients $K_P$ and $K_B$ are altered. Further, where video data having small motion is compressed and coded, if such weighting coefficients $K_P$ and $K_B$ that allocate much amount of data to the I pictures, that is, the weighting coefficients $K_P$ and $K_B$ having large values, are used, the quality of the compressed video data is improved. Conversely, where such weighting coefficients $K_P$ and $K_B$ that allocate much amount of data to the P pictures and B pictures, that is, the weighting coefficients $K_P$ and $K_B$ having small values, are used, the quality of the compressed video data is improved.

In the fourth embodiment, an explanation will be made of a video data compression apparatus 3 which is an apparatus obtained by enhancing the video data compression apparatuses 1 and 2 (FIG. 1 to FIG. 3, FIG. 5, FIG. 6) and for compressing the video data by the FFRC system similar to them, wherein the weighting coefficients $K_P$ and $K_B$ used when calculating the target amount of data $T_j$ for every picture type are adaptively altered and adjusted in accordance with the motion and pattern of the noncompressed video data and the quality of the compressed video data.

Figure 14:
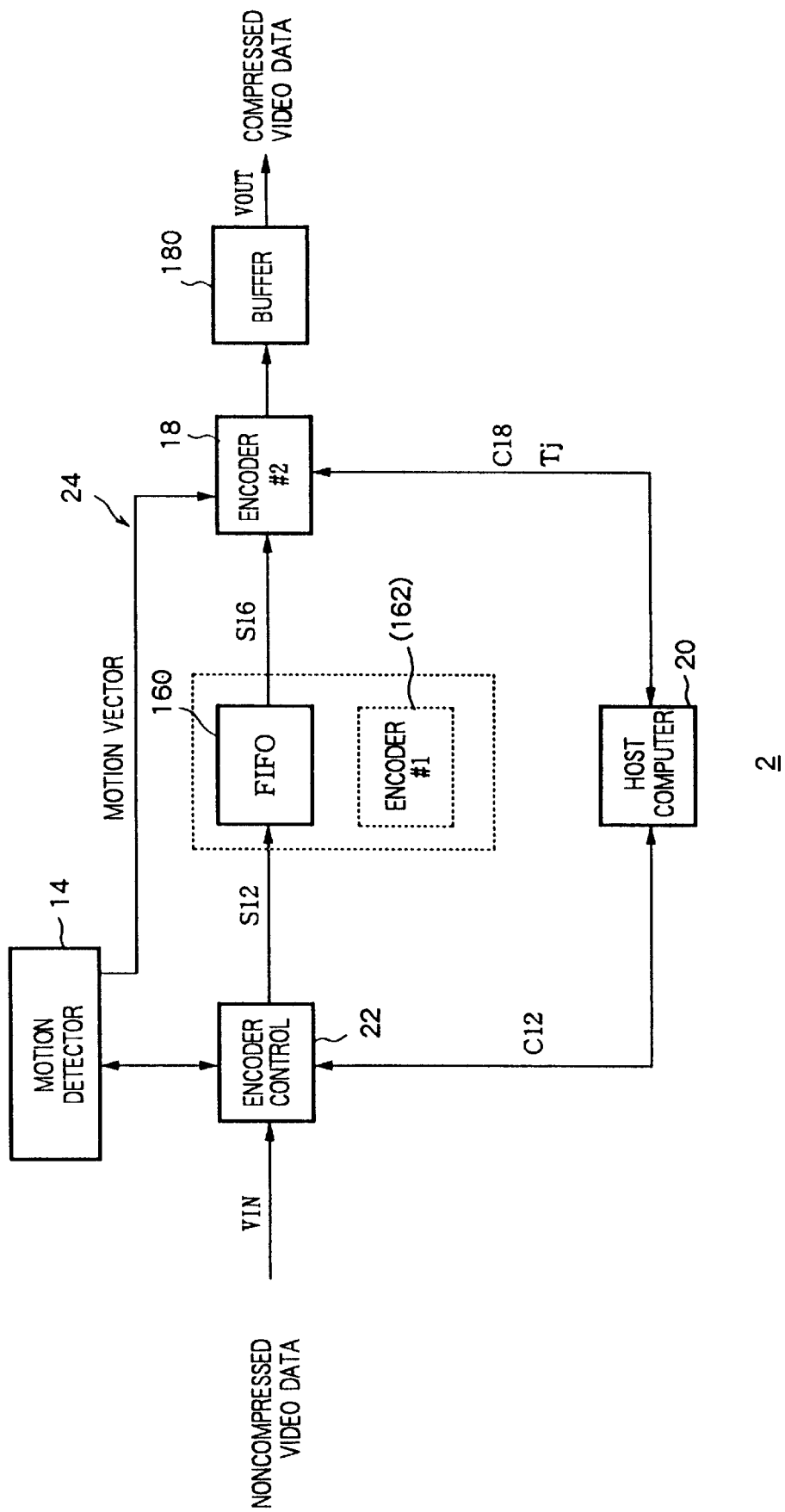
FIG. 14 is a view of the configuration of a video data compression apparatus according to the present invention in a fourth embodiment.

FIG. 14 is a view of the configuration of the video data compression apparatus 3 according to the present invention in the fourth embodiment.

Figure 15:
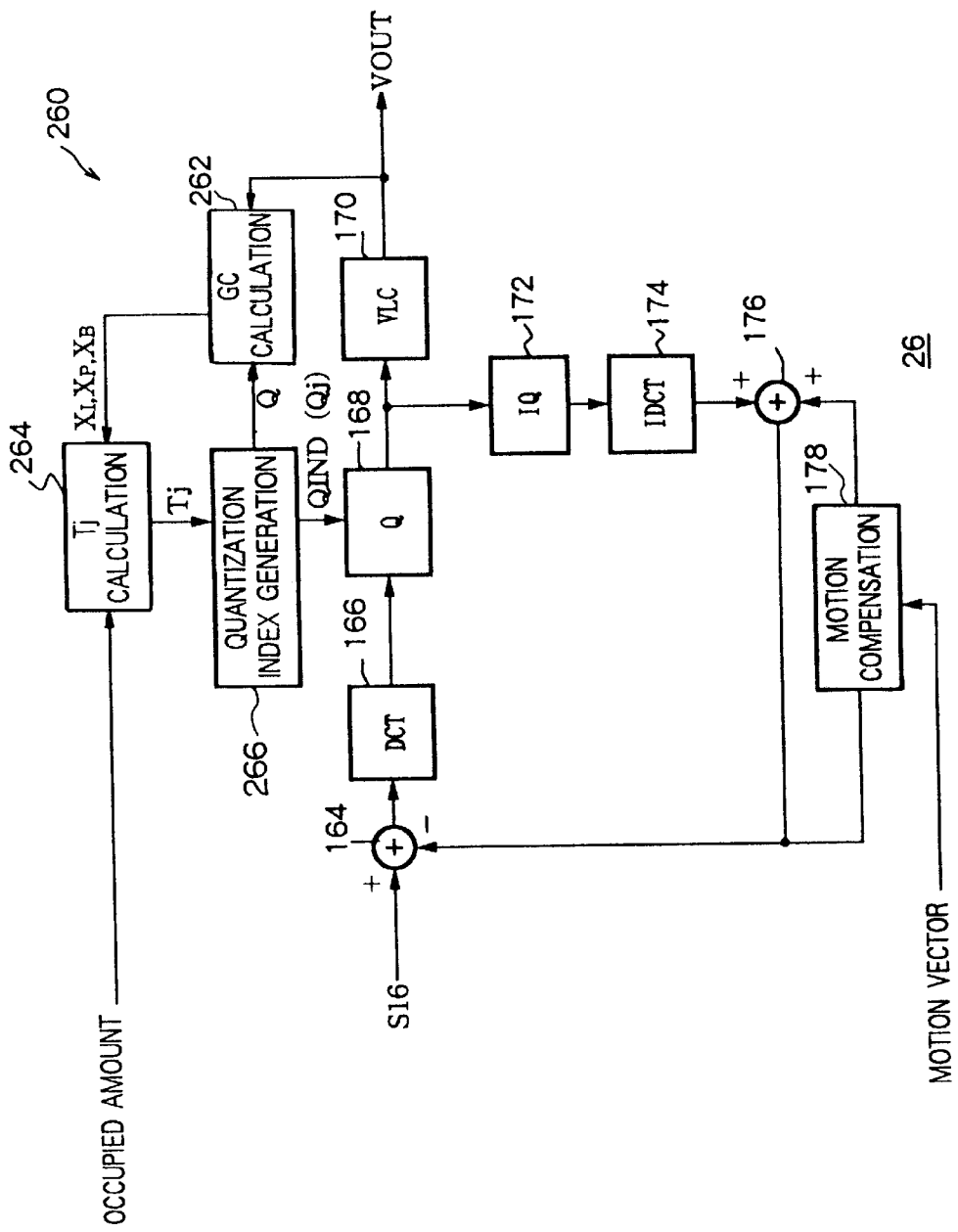
FIG. 15 is a view of the configuration of the encoder shown in FIG. 14.

FIG. 15 is a view of the configuration of the encoder 26 shown in FIG. 14.

As shown in FIG. 14, the video data compression apparatus 3 adopts a configuration in which the encoder 18 of the video data compression apparatus 2 (FIG. 5, FIG. 6) is substituted with the encoder 26.

Note that, in FIG. 14 and FIG. 15, the same references are attached to the same constituent parts as the constituted parts of the video data compression apparatus 1 shown in FIG. 1 to FIG. 3 and the video data compression apparatus 2 shown in FIG. 5 and FIG. 6 among the constituent parts of the video data compression apparatus 3.

Further, as shown in FIG. 15, the encoder 26 has a quantization control unit 260 containing a global complexity calculation circuit (GC calculation circuit) 262, a target data amount calculation ($T_j$ calculation) circuit 264, and a quantization index generation circuit 266 in place of the quantization control circuit 180 and is constituted so as to be able to calculate the target amount of data $T_j$ based on the real difficulty data $D_j$ or the global complexities $X_I$, $X_P$ and $X_B$ not depending upon the host computer 20.

The video data compression apparatus 3 compresses and codes and outputs the noncompressed video data by the FFRC system explained in the second embodiment and the third embodiment by these constituent parts.

Below, the operation of the constituent parts of the quantization control unit 260 will be explained.

The GC calculation circuit 262 calculates the global complexities $X_I$, $X_P$, and $X_B$ of the picture types as shown in Equation 8-1 to Equation 8-3 (third embodiment) based on the amounts of data $S_I$, $S_P$, and $S_B$ of the compressed video data output from the variable length quantization circuit 170 and the average values $Q_I$, $Q_P$, and $Q_B$ of the quantization values used by the quantization circuit 168 for quantization and outputs the same to the target data amount calculation circuit 264 and the quantization index generation circuit 266 and, if necessary, the host computer 20.

The target data amount calculation circuit 264 approximates the real difficulty data D of each picture type by the global complexities $X_I$, $X_P$, and $X_B$ input from the GC calculation circuit 262 similar to for example the first stage (step 1) of TM5 of the MPEG system, calculates the target amounts of data $T_j$ of the pictures of picture types as shown in Equation 11-1 to Equation 11-3 (third embodiment), and outputs the same to the quantization index generation circuit 266.

As explained above by mentioning the concrete example, for example, when video data large in motion but simple in pattern is compressed and coded, it is more desirable if the weighting coefficients $K_P$ and $K_B$ are not altered, but made the default value, the values of the weighting coefficients $K_P$ and $K_B$ are made large when the part having small motion in the video data of a pattern having a high coding difficulty (value of the real difficulty data $D_j$ is large) is compressed and coded, and conversely the values of the weighting coefficients $K_P$ and $K_B$ are made relatively small when the video data of large motion is compressed and coded.

The contents of the updating processing of the weighting coefficients $K_P$ and $K_B$ in the target data amount calculation circuit 264 will be further explained by referring to Equation 14, Equation 15-1, and Equation 15-2.

In order to decide how much should the weighting coefficients $K_P$ and $K_B$ be altered, a parameter such as ratio x of the real difficulty data $D_j$ with respect to the data rate of the compressed video data VOUT shown below is introduced.

$$x = \frac{\sum_{k=1}^{N} D_k}{G} \quad (14)$$

$$G = (\text{bitrate} \times N) / \text{picture\_rate}$$

Note, in Equation 14, bitrate is the amount of generated data (data rate) per one second, N is the number of pictures per one GOP, and picture rate is the number of pictures per one second.

Further, the magnitude of motion of the noncompressed video data can be decided according to the ratio ($D_I/D_P$) of the real difficulty data $D_P$ of the P picture with respect to the real difficulty data $D_I$ of the I picture, and the ratio ($D_I/D_B$) of the real difficulty data $D_B$ of the B picture with respect to the real difficulty data $D_I$ of the I picture.

Accordingly, the target data amount calculation circuit 264 calculates the weighting coefficient $K_P$ of the P picture so as to be proportional to the ratio ($D_I/D_P$) of the real difficulty data $D_I$ of the newest I picture and the real difficulty data $D_P$ of the P picture, and the ratio ($D_I/D_B$) of the real difficulty data $D_I$ of the newest I picture and the real difficulty data $D_B$ of the B picture.

Figure 16:
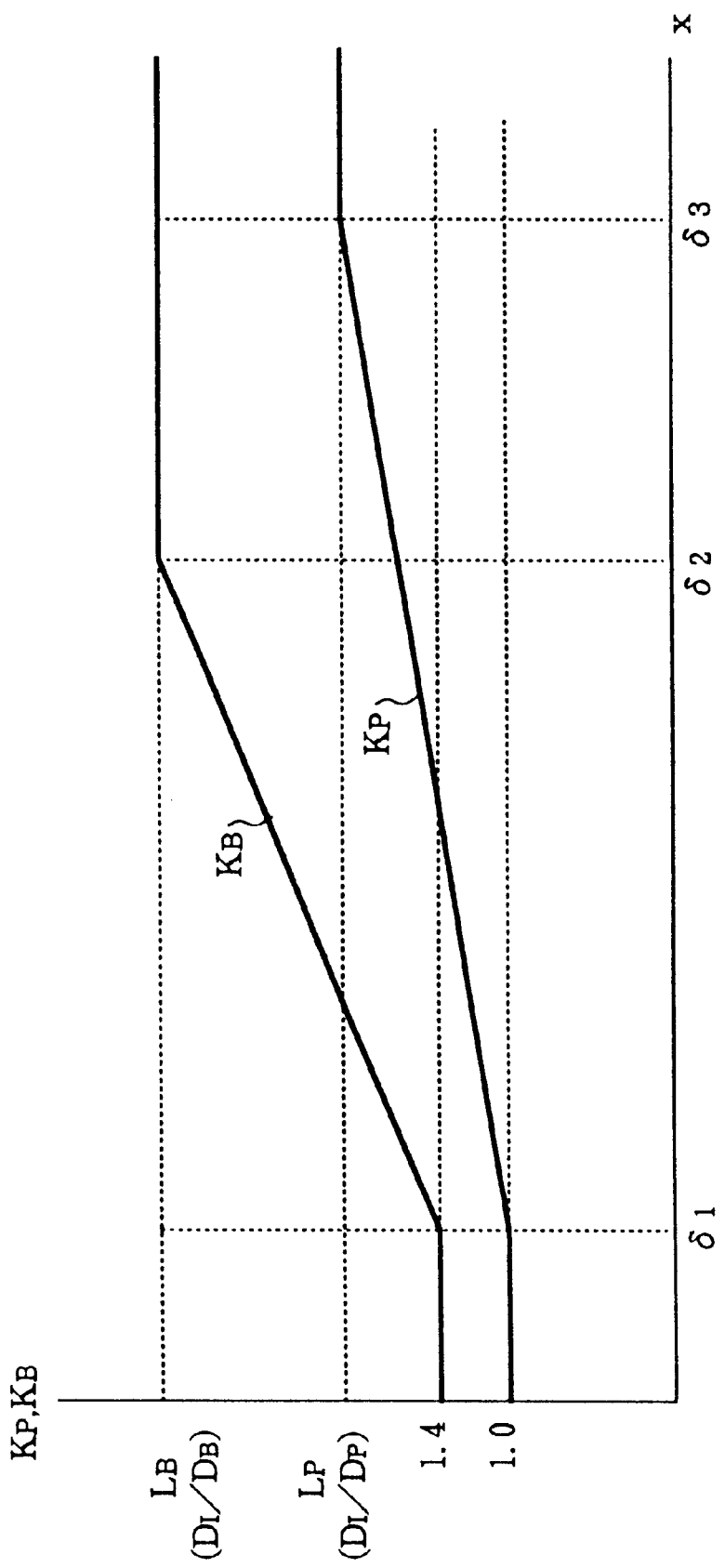
FIG. 16 is a view of the weighting coefficients $K_P$ and $K_B$ of the P picture and the B picture calculated by a target data amount calculation circuit (FIG. 15).

FIG. 16 is a view showing the weighting coefficients $K_P$ and $K_B$ of the P picture and the B picture to be calculated by the target data amount calculation circuit 264 (FIG. 15).

However, according to a certain complexity of the pattern and magnitude of motion of the noncompressed video data, where the weighting coefficients $K_P$ and $K_B$ and the ratios ($D_I/D_P$, $D_I/D_B$) are simply brought into proportion to each other, there is a case where the values of the weighting coefficients $K_P$ and $K_B$ become extremely large and extremely small. Accordingly, predetermined threshold values $\delta_2$, $\delta_3$ and $\delta_3$ ($\delta_1 < \delta_2$, $\delta_3$) are provided as the ratio x (Equation 14).

Where the ratio x is smaller than the threshold value $\delta_1$, it can be decided that the data rate of the compressed video data VOUT is sufficiently large or the pattern of the noncompressed video data is simple or the motion is small, and therefore a default value is used so that the values of the weighting coefficients $K_P$ and $K_B$ do not become too small (note, the amount of data to be allocated becomes too large). On the other hand, where the motion is very small regardless of the fact that the pattern of the noncompressed video data is complex, the value of the real difficulty data $D_I$ of the I picture becomes very large in comparison with the real difficulty data $D_P$ and $D_B$ of the P picture and the B picture.

In order to deal with these cases, the weighting coefficients $K_P$ and $K_B$ become too large exceeding necessity (note, the amount of data to be allocated becomes too small), and therefore the threshold value $\delta_3$ is provided as the ratio x for the P picture and the threshold value $\delta_2$ is provided as the ratio x for the B picture, and the weighting coefficients $K_P$ and $K_B$ are limited as the upper limit values $L_P$ and $L_B$ for the part where the ratio x exceeds these threshold values $\delta_3$ and $\delta_2$.

Note that, the relationships between the weighting coefficients $K_P$ and $K_B$ and the ratio x become as shown in following Equation 15-1 and Equation 15-2 within a range of from the threshold value $\delta_1$ to threshold value $\delta_3$ and a range of from the threshold value $\delta_1$ to threshold value $\delta_2$, respectively.

$$K_P = 1 + \frac{(x - \delta_1)\left(\frac{D_I}{D_P} - 1\right)}{\delta_3 - \delta_1} \quad (15\text{-}1)$$

$$K_P = 1.4 + \frac{(x - \delta_1)\left(\frac{D_I}{D_B} - 1\right)}{\delta_2 - \delta_1} \quad (15\text{-}2)$$

The target data amount calculation circuit 264 calculates the weighting coefficients $K_P$ and $K_B$ of the P picture and the B picture by using Equation 15-1 and Equation 15-2 within the range of from the threshold value $\delta_1$ to threshold value $\delta_3$ and the range of from the threshold value $\delta_1$ to threshold value $\delta_2$, respectively as mentioned above, and limits the same to the default values or upper limit values $L_P$ and $L_B$ (=$D_I/D_P$, $D_I/D_B$) out of these ranges.

The quantization index generation circuit 266 generates the quantization index from the target amount of data $T_j$ input from the target data amount calculation circuit 264 and the global complexities $X_I$, $X_P$, and $X_B$ input from the GC calculation circuit 262 similar to the second stage and third stage (step 2, step 3) of TM5 of for example the MPEG system and outputs the same to the quantization circuit 168.

Note that, the quantization index is the data used as the index indicating the combination of quantization values $Q_j$ changing for every macroblock which becomes the unit of the quantization processing in the quantization circuit 168 and has a one-to-one correspondence with the quantization values $Q_j$. That is, the quantization circuit 168 receiving the quantization index from the quantization index generation circuit 266 transforms the same to the combination of quantization values $Q_j$ indicated by the received quantization index and quantizes the video data input from the DCT circuit 166.

Below, the operation of the video data compression apparatus 3 (FIG. 14, FIG. 15) will be explained.

The motion estimator 14 performs the generation etc. of the motion vector similar to that in the first embodiment to the third embodiment.

The encoder control unit 22 performs the preprocessing such as rearrangement of pictures similar to that in the second embodiment and the third embodiment.

The FIFO memory 160 delays the input video data by exactly an amount of L pictures similar to that in the first embodiment to the fourth embodiment.

Whenever the encoder 26 (FIG. 15) terminates one picture's worth of compression and coding, the GC calculation circuit 262 of the quantization control unit 260 calculates the average value of the quantization values $Q_j$ from the quantization index of the quantization index generation circuit 266, substitutes the average value of the quantization values $Q_j$ and the amount of data of the compressed video data in Equation 8-1 to Equation 8-3 (third embodiment), and calculates the global complexities $X_I$, $X_P$, and $X_B$.

The target data amount calculation circuit 264 of the compressed video data performs the processing shown in Equation 14, Equation 15-2, and Equation 15-2 based on the real difficulty data $D_j$ ($D_I$, $D_P$, and $D_B$) of the picture of each picture type which are generated newest, updates the weighting coefficients $K_P$ and $K_B$ of each picture type, and calculates the target amount of data $T_j$ of next picture as shown in Equation 11-1 to Equation 11-3 (third embodiment).

The quantization index generation circuit 266 calculates the quantization index based on the calculated target amount of data $T_j$ and the global complexities $X_I$, $X_P$, and $X_B$ and sets the same in the quantization circuit 168 of the encoder 26.

The DCT circuit 166 performs the DCT processing with respect to the next picture similar to that in the first embodiment to the third embodiment.

The quantization circuit 168 transforms the set quantization index to the quantization value $Q_j$ for the DCT-processed video data and performs the quantization processing by the quantization value $Q_j$ obtained by the change.

The variable length quantization circuit 170 performs the variable length coding similar to that in the first embodiment to the third embodiment, generates the compressed video data VOUT of an amount of data almost near the target amount of data $T_j$ and outputs the same via the buffer memory 182.

Note that, the target data amount calculation circuit 264 of the video data compression apparatus 3 can be modified so as to perform the updating of the weighting coefficients $K_P$ and $K_B$ by using the global complexities $X_I$, $X_P$, and $X_B$ input from the GC calculation circuit 262 in place of the real difficulty data $D_j$.

Further, in such a case, it is also possible to replace ratios $(D_I/D_P, D_I/D_B)$ used in Equation 15-1 and Equation 15-2 to $(X_I/X_P, X_I/X_B)$ by using the global complexities $X_I$, $X_P$, and $X_B$.

Further, in the fourth embodiment, as shown in FIG. 16, the relationships of the weighting coefficients $K_P$ and $K_B$ and the ratio x within the predetermined range were represented by primary functions (Equation 15-1 and Equation 15-2), but if there are more adequate functions for representing the relationships of the weighting coefficients $K_P$ and $K_B$ and the ratio x in this range, it is also possible to modify the same so that the target data amount calculation circuit 264 updates the weighting coefficients $K_P$ and $K_B$ by using these functions.

Further, the contents of processing of the video data compression apparatus 3 shown as the fourth embodiment can be applied to also the video data compression apparatuses 1 and 2 (FIG. 1 to FIG. 3, FIG. 5, FIG. 6) shown in the first embodiment to the third embodiment.

Further, the definition equation (Equation 14) of the ratio x shown in the fourth embodiment and the calculation equations (Equation 15-1, Equation 15-2) of the weighting coefficients $K_P$ and $K_B$ are examples. It is also possible to modify the operation of the target data amount calculation circuit 264 so as to calculate the other parameters having similar meaning by other equations.

Further, it Is also possible to modify the content of the processing of the target data amount calculation circuit 264 so as to obtain the weighting coefficients $K_P$ and $K_B$ by finding the relationships of the ratio x and the weighting coefficients $K_P$ and $K_B$ in advance by experiments etc., preparing a table indicating the relationships of these numerical values, and referring to the table based on the ratio x.

Further, it is also possible to perform the processing performed by the quantization control unit 260 in the video data compression apparatus 3 by the host computer 20 in the video data compression apparatuses 1 and 2.

Further, the modifications shown in the first embodiment to the third embodiment are also possible with respect to the video data compression apparatus 3 shown in the fourth embodiment.

Further, in this embodiment, the explanation was made of the case that both of the weighting coefficients $K_P$ and the weighting coefficients $K_B$ are adaptively altered. But other case, such as one of the weighting coefficients $K_P$ and the weighting coefficients $K_B$ are alterable and other weighting coefficients is kept at predetermined value, is also passible.

Further, in this embodiment, three picture types of I picture, P picture and B picture are used for compression. But, by using only I picture and P picture excepting B picture, or I picture and B picture excepting P picture, the compression is also passible.

Further, in this embodiment, an explanation was made using the example in which encoder 18 of second embodiment is replaced with encoder 26. Namely, this embodiment was explained as a modified system of the simplified two pass encoding system. But the characteristic of this embodiment is adaptable to the first embodiment of the present invention. Namely, the weighting coefficients $K_P$ and $K_B$ for calculating the target data amount in encoder 18 may be altered in host computer 20 using real difficulty data calculated based on the result of precompression of encoder 162 and equation 11-1, 11-2 and 11-3. In this case, all data of DI, Dp, Db, Dk are real difficulty data calculated by host computer 20 based on the result of the compression of encoder 162.

As explained above, by the video data compression apparatus according to the present invention and the method of the same, audio and/or video data can be compressed and coded to a predetermined amount of data or less by a method other than the two pass encoding.

Further, by the video data compression apparatus according to the present invention and the method of the same, the video data can be compressed and coded in almost real time and in addition a high quality image can be obtained after expansion and decoding.

Further, by the video data compression apparatus according to the present invention and the method of the same, the compression rate is adjusted by estimating the amount of data after the compression and coding and the compression and coding processing can be carried out by a method other than two pass encoding.

What is claimed is:

1. A video data compression apparatus for compressing noncompressed video data to compressed video data of a picture type sequence containing a plurality of types of pictures (I frame, P frame, and B frame) in a predetermined order based on a predetermined compression method, said video data compression apparatus comprising:

a difficulty data calculating means for calculating difficulty data indicating the difficulty of the noncompressed video data corresponding to the amount of data of each of the picture types after compression;

a target value calculating means for calculating a target value of the amount of data of the picture of each of the picture types after the compression based on said difficulty data of each of the calculated picture types and a weighting coefficient for weighting the amount of data of each of the picture types after the compression;

a compressing means for compressing the picture of each of picture types of the noncompressed video data by said predetermined compression method so that the amount of data after compression becomes the target value of the picture type which was calculated so as to generate the compressed video data; and a weighting coefficient updating means for updating the weighting coefficient of each of the picture types based on the amount of data of the generated compressed video data.

2. A video data compression apparatus as set forth in claim 1, wherein said weighting coefficient updating means determines at least a weighting coefficient $K_P$ of a P picture and a weighting coefficient $K_B$ of a B picture to such values that the amount of data after compression of the P picture and the B picture after compression becomes large when the amount of data after compression can be increased and when the motion of the image of the noncompressed video data is large.

3. A video data compression apparatus as set forth in claim 2, wherein said weighting coefficient updating means calculates and updates at least each of the weighting coefficient $K_P$ of the P picture and the weighting coefficient $K_B$ of the B picture based on a ratio x ($x=\Sigma D_k/G$) of an added value $\Sigma D_k$ of a predetermined number of difficulty data $D_k$ with respect to data amount G equally allocated for every predetermined number of pictures, a ratio ($D_I/$ $D_P$) of the difficulty data of the newest P picture with respect to the difficulty data of the newest I picture, and/or a ratio ($D_I/D_B$) of the difficulty data of the newest B picture with respect to the difficulty data of the I picture.

4. A video data compression apparatus as set forth in claim 3, wherein said weighting coefficient updating means respectively provides upper limit values $L_P$ and $L_B$ for the weighting coefficients $K_P$ and $K_B$ of the P picture and/or the B picture and makes the values of the weighting coefficients $K_P$ and $K_B$ exceeding the upper limit values $L_P$ and $L_B$ the upper limit values $L_P$ and $L_B$ when the calculated weighting coefficients $K_P$ and $K_B$ exceed the upper limit values $L_P$ and $L_B$.

5. A video data compression apparatus as set forth in claim 1, wherein said target value calculating means calculates the target values $T_j$ of the I picture, P picture, and/or the B picture based on the weighting coefficient $K_P$ of the P picture, the weighting coefficient $K_B$ of the B picture, the difficulty data $D_j$ of the j-th picture, the difficulty data $D_I$ of the newest I picture, an amount of data $R_j$ in the case of equal allocation to the pictures, the added value $\Sigma D_P$ obtained by adding the difficulty data of a predetermined number of P pictures, and an added value $\Sigma D_B$ obtained by adding the difficulty data of a predetermined number of B pictures.

6. A video data compression apparatus as set forth in claim 5, wherein said target value calculating means calculates the target value $T_j$ of the j-th picture of the I picture by a first equation [$T_j = K_P K_B D_j R_j / (K_P K_B D_I + K_B \Sigma D_P + K_P \Sigma D_B)$];

calculates the target value $T_{pj}$ of the j-th picture of the P picture by a second equation [$T_j = K_B D_B R_j / (K_P K_B D_I + K_B \Sigma D_P + K_P \Sigma D_B)$]; and calculates the target value $T_j$ of the j-th picture of the B picture by a third equation [$T_j = K_P D_B R_j / (K_P K_B D_I + K_B \Sigma D_P + K_P \Sigma D_B)$].

7. A video data compression method for compressing input video data to compressed video data of a picture type sequence containing a plurality of types of pictures (I frame, P frame, and/or B frame) in a predetermined order, said video data compression method comprising the steps of:

calculating difficulty data indicating a difficulty of input video data corresponding to the amount of data of each of the picture types after compression;

calculating a target value of the amount of data of the picture of each of the picture types after the compression based on the difficulty data of each of the calculated picture types and a weighting coefficient for weighting the amount of data of each of the picture types after the compression;

compressing the picture of each of the picture types of the input video data by the predetermined compression method so that the amount of data after compression becomes the target value of the picture type which was calculated so as to generate the compressed video data; and updating the weighting coefficient of each of the picture types based on the amount of data of the generated compressed video data.

8. A video data compression method as set forth in claim 7, wherein at least a weighting coefficient $K_P$ of a P picture and/or a weighting coefficient $K_B$ of a B picture are determined to such values that the amount of data after compression of the P picture and the B picture after compression becomes large when the amount of the whole compressed data can be increased and when the motion of the image of the input video data is large.

9. A video data compression method as set forth in claim 8, wherein at least each of the weighting coefficient $K_P$ of the P picture and the weighting coefficient $K_B$ of the B picture are calculated and updated based on a ratio x ($x = \Sigma D_k / G$) of an added value $\Sigma D_k$ of a predetermined number of difficulty data $D_k$ with respect to data amount G equally allocated for every predetermined number of pictures, a ratio ($D_I/D_P$) of the difficulty data of the newest P picture with respect to the difficulty data of the newest I picture, and a ratio ($D_I/D_B$) of the difficulty data of the newest B picture with respect to the difficulty data of the I picture.

10. A video data compression method as set forth in claim 9, wherein upper limit values $L_P$ and $L_B$ are respectively provided for the weighting coefficients $K_P$ and $K_B$ of the P picture and the B picture and values of the weighting coefficients $K_P$ and $K_B$ exceeding the upper limit values $L_P$ and $L_B$ are made the upper limit values $L_P$ and $L_B$ when the calculated weighting coefficients $K_P$ and $K_B$ exceed the upper limit values $L_P$ and $L_B$.

11. A video data compression method as set forth in claim 7, wherein the target values $T_j$ of the I picture, the P picture, and the B picture are calculated based on the added value $\Sigma D_P$ obtained by adding the weighting coefficient $K_P$ of the P picture, the weighting coefficient $K_B$ of the B picture, the difficulty data $D_j$ of the j-th picture, the difficulty data $D_I$ of the newest I picture, an amount of data $R_j$ in a case of equal allocation to the pictures, the difficulty data of predetermined number of P pictures, and an added value $\Sigma D_B$ obtained by adding the difficulty data of a predetermined number of B pictures.

12. A video data compression method as set forth in claim 11, wherein:

the target value $T_j$ of the j-th picture of the I picture is calculated by a first equation [$T_j = K_P K_B D_j R_j / (K_P K_B D_I + K_B \Sigma D_P + K_P \Sigma D_B)$];

the target value $T_{pj}$ of the j-th picture of the P picture is calculated by a second equation [$T_j = K_B D_B R_j / (K_P K_B D_I + K_B \Sigma D_P + K_P \Sigma D_B)$]; and the target value $T_j$ of the j-th picture of the B picture is calculated by a third equation [$T_j = K_P D_B R_j / (K_P K_B D_I + K_B \Sigma D_P + K_P \Sigma D_B)$].

* * * * *